US009049063B2

(12) United States Patent
Alexander et al.

(10) Patent No.: US 9,049,063 B2
(45) Date of Patent: *Jun. 2, 2015

(54) METHOD AND SYSTEM FOR COMMUNICATION IN A WIRELESS NETWORK

(71) Applicant: Cohda Wireless Pty. Ltd., Kent Town (AU)

(72) Inventors: Paul Dean Alexander, Kent Town (AU); Alexander James Grant, North Adelaide (AU); David Victor Lawrie Haley, Stepney (AU)

(73) Assignee: Cohda Wireless Pty. Ltd. (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/453,516

(22) Filed: Aug. 6, 2014

(65) Prior Publication Data
US 2014/0349601 A1 Nov. 27, 2014

Related U.S. Application Data

(63) Continuation of application No. 12/224,457, filed as application No. PCT/AU2007/000231 on Feb. 27, 2007.

(30) Foreign Application Priority Data

Feb. 27, 2006 (AU) ................................ 2006900984

(51) Int. Cl.
*H04K 1/10* (2006.01)
*H04L 25/02* (2006.01)
(Continued)

(52) U.S. Cl.
CPC .......... *H04L 25/022* (2013.01); *H04L 25/0224* (2013.01); *H04L 25/03159* (2013.01); *H04L 27/2647* (2013.01); *H04B 1/10* (2013.01); *H04B 1/16* (2013.01)

(58) Field of Classification Search
USPC ......... 375/260, 267, 299, 343, 346, 347, 349, 375/350; 445/334
See application file for complete search history.

(56) References Cited

U.S. PATENT DOCUMENTS 6,320,903 B1 * 11/2001 Isaksson et al. .............. 375/232
7,039,004 B2    5/2006 Sun et al.
(Continued)

FOREIGN PATENT DOCUMENTS

WO WO-2006/008611 A1 1/2006

OTHER PUBLICATIONS

"802.11gTM IEEE Local and Metropolitan Area Networks; Part 11: Wireless LAN Medium Access Control (MAC) and Physical Layer (PHY) specifications; Amendment 4:Further Higher Data Rate extension in the 2.4 GHz Band", IEEE Std. 802.11Gtm—2003, The Institute of Electrical and Electronics Engineers, Inc. NY, (Jun. 27, 2003), 78 pgs.

(Continued)

*Primary Examiner* — Kabir A Timory
(74) *Attorney, Agent, or Firm* — Schwegman Lundberg & Woessner, P.A.

(57) ABSTRACT

Methods and apparatus are described for processing data in a wireless communication network. Iterative estimation techniques are used to enable tracking of time-varying communication channels. A signal is transmitted over a channel in the network, the signal comprising a sequence of symbols carried on a plurality of sub-carriers. Boot-up estimator estimates, in a time domain, parameters of a model of the channel based on the received signal. A domain converter transforms at least one of the estimated parameters from the time domain to provide at least one transformed parameter in a second domain. An equalizer and decoder determine estimates of symbols from the received signal using the at least one transformed parameter, and tracking estimator updates the estimated model parameters during reception of the signal using at least one estimated symbol.

52 Claims, 13 Drawing Sheets

(51) Int. Cl.
*H04L 25/03* (2006.01)
*H04L 27/26* (2006.01)
*H04B 1/10* (2006.01)
*H04B 1/16* (2006.01)

(56) References Cited

U.S. PATENT DOCUMENTS

| | | | |
|---|---|---|---|
| 7,356,096 B2* | 4/2008 | Reid | 375/340 |
| 2005/0094738 A1 | 5/2005 | Park et al. | |
| 2005/0141649 A1 | 6/2005 | Tanabe | |
| 2007/0036179 A1 | 2/2007 | Palanki et al. | |
| 2007/0098090 A1 | 5/2007 | Ma et al. | |
| 2010/0183104 A1 | 7/2010 | Alexander et al. | |

OTHER PUBLICATIONS

"802.16fTM—IEEE Standard for Local and Metropolitan Area Networks, Part 16: Air Interface for Fixed Broadban Wireless Access Systems, Amendment 1: Management Information Base", IEEE Std. 802.16fTM—2005, (2005), 257 pgs.
"U.S. Appl. No. 12/224,457, Response filed Dec. 19, 2013 to Non Final Office Action mailed Aug. 30, 2013", 23 pgs.
"U.S. Appl. No. 12/224,457, Advisory Action mailed Jul. 24, 2013", 2 pgs.
"U.S. Appl. No. 12/224,457, Examiner Interview Summary mailed Feb. 20, 2014", 1 pg.
"U.S. Appl. No. 12/224,457, Examiner Interview Summary mailed Aug. 28, 2013", 2 pgs.
"U.S. Appl. No. 12/224,457, Examiner Interview Summary mailed Nov. 18, 2013", 3 pgs.
"U.S. Appl. No. 12/224,457, Examiner Interview Summary mailed Dec. 17, 2013", 3 pgs.
"U.S. Appl. No. 12/224,457, Final Office Action mailed Mar. 1, 2013", 17 pgs.
"U.S. Appl. No. 12/224,457, Non Final Office Action mailed Jun. 19, 2012", 14 pgs.
"U.S. Appl. No. 12/224,457, Non Final Office Action mailed Aug. 30, 2013", 19 pgs.
"U.S. Appl. No. 12/224,457, Notice of Allowability mailed May 30, 2014", 2 pgs.
"U.S. Appl. No. 12/224,457, Notice of Allowance mailed Feb. 20, 2014", 9 pgs.
"U.S. Appl. No. 12/224,457, Preliminary Amendment filed Aug. 26, 2008", 17 pgs.
"U.S. Appl. No. 12/224,457, Response filed Jun. 26, 2013 to Final Office Action mailed Mar. 1, 2013", 23 pgs.
"U.S. Appl. No. 12/224,457, Response filed Dec. 19, 2012 to Non Final Office Action mailed Jun. 19, 2012", 22 pgs.
"Channel Models for IEEE 802.20 MBWA System Stimulations Rev 03", IEEE C802.20-03/92 / IEEE Working Group 802.20, (Nov. 6, 2003), 24 pgs.
"International Application Serial No. PCT/AU2007/000231, International Search Report mailed Mar. 30, 2007", 2 pgs.
"International Application Serial No. PCT/AU2007/000231, Written Opinion mailed Mar. 30, 2007", 4 pgs.
"Supplement to IEEE Standard for Information technology—telecommunications and information exchange between systems—local and metropolitan area networks—specific requirements. Par II: wireless LAN Medium Access Control (MAC) and Physical Layer (PHY) specifi", IEEE STD 802.11a-1999, IEEE Computer Society, New York, NY, (1999), 91 pgs.
Alexander, P., et al., "Physical Layer Technology Enabling Mobile Use of 802.11 in Outdoor Environments", Cohda Wireless Whitepaper, (Feb. 27, 2006), 16 pgs.
Medbo, J., et al., "Channel Models for HIPERLAN/2 in Different Indoor Scenarios", ETSI/EP BRAN Document No. 3ER1085B, (Mar. 30, 1998), 8 pgs.
Terry, J., et al., "Chapter 1—Background and WLAN Overview", OFDM Wireless LANs: A Theoretical and Practical Guide, Sams Publishing, (2002), 1-46.
Terry, J., et al., "Chapter 2—Synchronization", OFDM Wireless LANs: A Theoretical and Practical Guide, Sams Publishing, (2002), 47-85.
"U.S. Appl. No. 12/224,457, Notice of Allowability mailed Aug. 18, 2014", 3 pgs.

* cited by examiner

METHOD AND SYSTEM FOR COMMUNICATION IN A WIRELESS NETWORK

RELATED APPLICATIONS

This application is a continuation application of U.S. patent application Ser. No. 12/224,457 filed Aug. 26, 2008 as a nationalization under 35 U.S.C. 371 of PCT/AU2007/000231, filed Feb. 27, 2007 and published as WO 2007/095697 A1 on Aug. 30, 2007, which claimed priority under 35 U.S.C. 119 to Australian Patent Application Serial No. 2006900984, filed Feb. 27, 2006; which applications and publication are incorporated herein by reference and made a part hereof.

FIELD OF INVENTION

The present invention relates to the field of wireless communications. In particular, the present invention relates to improved multi-carrier wireless communications. In one particular form, the invention relates to an improved signal processing method and apparatus for a wireless communication system. It will be convenient to hereinafter describe the invention in relation to the use of a packet based wireless OFDM (Orthogonal Frequency Division Multiplexing) communication system, however, it should be appreciated that the present invention may not be limited to that use.

BACKGROUND

Throughout this specification the use of the word "inventor" in singular form may be taken as reference to one (singular) or more (plural) inventors of the present invention. The inventor has identified the following related art.

In Applicant's co-pending International (PCT) Applications, PCT/AU03/00502 and PCT/2004/001036 both published under WIPO publication Numbers WO 03/094037 and WO 2005/11128 respectively, a number of background art systems have been identified relating in particular to wireless communications systems based on so-called multiple access techniques in which information such as voice and data are communicated. The specifications of WO 03/094037 and WO 2005/11128 are incorporated herein by reference in their entirety.

The inventor has recognised that the performance of a Mobile Communications System may be heavily dependent on the quality of the Physical Layer (PHY) processing. The PHY may provide for delivering coverage and robustness to radio links between nodes that move through hostile propagation conditions such as those encountered outdoors, and areas of high interference. Mobility, and in particular high speed terrestrial mobility, may induce yet another set of difficulties for the PHY as the reflections off the surrounding buildings, vehicles and other bodies may combine in a time varying manner.

Some wireless network vendors have incorporated legacy IEEE 802.11 radio technologies into their systems. Conventional IEEE 802.11 radios have been designed for stationary indoor propagation environments and their use in outdoor mobile communications networks may be ill founded from a technical perspective. Standardization efforts within the IEEE 802.16e and 802.20 Physical Layer working groups may be considered as focused on providing a waveform for transmission that is more compatible with the communications challenges faced while travelling outdoors at speed. Standards typically do not specify how to receive signals, rather focussing on what signals should be transmitted. The vendors are then responsible for the receiver technology.

The inventor considers that Orthogonal Frequency Division Multiplexing (OFDM) is well suited to broadband wireless communications. However, this technique may have been historically applied to the problem of transmitting data in a stationary indoor environment. The outdoor urban environment may contain many obstacles for the radio signal, such as buildings and trees, which are referred to as clutter. Present wireless technology may be able to offer high throughput only at the expense of receiver sensitivity, hence the cluttered urban environment may lead to poor coverage. Furthermore, the relative mobility between the transmitter and receiver may cause the placement of these obstacles to change in time. When the effects of mobility and clutter combine, the resulting wireless channel may present a significant challenge to the communications system designer.

The radio signal in an outdoor communications system may be subject to distortion caused by the propagation environment, i.e. channel, on the radio signal. The channel may distort the transmitted signal by altering its magnitude and/or phase, potentially resulting in the loss of information. Moreover, relative mobility between the transmitter and receiver, and/or time varying frequency offset effects, cause the channel conditions to vary with time.

Signal reflections and diffractions can result in multiple copies of the transmission being received, i.e. multipath effects. Typically each of these multipath components may have been subjected to different effects upon their phase and magnitude. The discrete time channel impulse response, and its associated Power Delay Profile (PDP), represent each multipath contribution as a time domain tap. A level of intensity, and a phase rotation, is assigned to each tap in order to represent its contribution to the overall received signal. The delay spread of the channel, is the delay between the arrival of the first and last multipath contributions in the PDP. The RMS delay spread, which is derived from its PDP, is a single value which accounts for each multipath contribution, weighted according to its delay and magnitude. A higher RMS delay spread indicates that the channel is likely to have a stronger effect on the signal.

The power delay profile for an example indoor wireless channel, based upon the ETSI BRAN model B [2] is shown in FIG. 1. This channel has an RMS delay spread of 150 ns.

Multipath propagation can lead to an OFDM symbol being subjected to interference from previously transmitted OFDM symbols, i.e. inter-symbol interference (ISI). Multipath effects can also degrade the orthogonality of subcarriers, thus leading to an individual subcarrier being subject to interference from other subcarriers within the same OFDM symbol, i.e. inter-carrier interference (101). OFDM provides several mechanisms which are intended to mitigate multipath effects. For example, it is common for each OFDM symbol to include a guard interval, which separates successively transmitted OFDM symbols. If the guard interval is selected to be greater than the delay spread of the channel then ISI and ICI cannot occur. The presence of this guard increases the time taken to transmit each OFDM symbol and thus reduces the data rate of the system, decreases the power efficiency and decreases the spectral efficiency of the system.

In order to successfully demodulate the signal, the influence of the channel is first cancelled and hence an estimate of the channel is required. A set of training symbols may be transmitted at the start of the packet to be used for channel estimation, which are known to the receiver. These symbols are referred to as preamble symbols and the technique is dictated in several standards, e.g. IEEE 802.11a/g and 802.16-2005. A common approach is to estimate the effect of the channel in the frequency domain [2]. To this end, a cyclic prefix 2 is inserted in the guard interval immediately prior to a symbol 4, containing a time-domain copy of the end 6 of the symbol, as shown in FIG. 2.

The presence of a cyclic prefix that is longer than the delay spread of the channel permits the assumption that the transmitted OFDM symbol undergoes a cyclic convolution with the channel. In this case, one method for calculating the channel response is to simply divide the received frequency domain symbol by the known preamble symbol. FIG. 3(a) shows an example of the channel estimate provided using this technique in an 802.11a system, for the indoor channel model presented above, in the absence of noise on the channel. The 802.11a standard specifies that each OFDM symbol have a total duration of 4 μs, including a 0.8 μs cyclic prefix. Moreover, the second long preamble symbol is identical to the first, providing an effective cyclic prefix of 3.2 μs duration for this symbol. This guard interval is significantly longer than the typical delay spread of the indoor channel and thus an accurate channel estimate can usually be obtained.

The coherence bandwidth of a channel is inversely proportional to its delay spread. Hence, as the indoor channel in the example above has a relatively short delay spread, a strong correlation between the frequency domain response of adjacent subcarriers is observed in FIG. 3(a). In cases where the coherence bandwidth is significantly larger then the subcarrier spacing, this correlation may be exploited to improve the accuracy of the estimate, for example by smoothing it across the frequency domain.

When the length of the delay spread does not exceed the cyclic prefix duration, the effect of the channel may be equalized in the frequency domain using a one-tap linear equalizer. Once the channel estimate has been obtained, it is used during the equalization process. Again employing the assumption of a time domain cyclic convolution of the transmitted data and the channel, the equalized frequency domain observation can be simply obtained via division of the received observation by the estimated channel response. FIG. 3(b) shows an observation, after frequency domain equalization, for the example indoor channel, when using an 802.11a system. Each OFDM data symbol is protected by a cyclic prefix of duration 0.8 μs, which is greater than the delay spread of the indoor channel, and hence no inter-symbol or inter-carrier interference is observed.

The outdoor propagation environment can be significantly more disruptive to a signal than that experienced indoors. When propagating through the outdoor urban environment, the radio signal is subject to obstacles such as buildings, trees and other clutter, which can lead to strong reflective and/or diffractive multipath effects [1]. As a result, the delay spread of the outdoor wireless channel is typically significantly larger than that of its indoor counterpart. The power delay profile for an example outdoor wireless channel is shown in FIG. 4. Here the IEEE 802.20 Typical Urban (Case-IV) model is employed, having an RMS delay spread of 0.8 μs.

The long delay spread experienced outdoors can present problems for conventional receiver techniques, such as the channel estimation and equalization methods described above. The problems arise if the cyclic prefix length is not sufficient to cover the delay spread of the channel. One such notable case exists when an OFDM waveform that is designed for indoor use, such as the IEEE 802.11a/g waveform, is employed in an urban outdoor environment. As described above, the second long preamble symbol in the 802.11a waveform is a replica of the first, and as such this training symbol is provided with an effective cyclic prefix of length 3.2 μs. Hence, when using the frequency domain channel estimation technique described above, the second long preamble is almost completely guarded from ISI and ICI effects being induced by the example outdoor channel. However, the residual channel effects cause a slight variation of the estimate from the exact channel, as illustrated in FIG. 5(a). Moreover, due to the long delay spread experienced outdoors, the coherence bandwidth of the channel is significantly shorter than that of the indoor channel. This may be observed when comparing the relatively low correlation between adjacent subcarriers in FIG. 5 (a) to the strong correlation shown in FIG. 2 (a). Hence the potential to improve the accuracy of the channel estimate via frequency domain smoothing is reduced for the case of the urban outdoor environment.

In contrast to the heavily guarded preamble, data bearing OFDM symbols in the 802.11a packet are only afforded a cyclic prefix guard of length 0.8 μs. Each multipath component which has a delay exceeding the guard length will contribute a part of the previously transmitted OFDM symbol into the received observation, effectively jumping over the guard interval. As a result, the assumption of a cyclic convolution between the time domain symbol and channel is invalid. The resulting equalized received observation is heavily distorted by ISI and ICI effects, as shown in FIG. 5(b).

The strong multipath effects experienced in an outdoor urban environment, result in a wireless channel which exhibits a high RMS delay spread. In some cases it may be possible to extend the length of the cyclic prefix beyond that of the delay spread. For example, the IEEE 802.16 standard provides several options for cyclic prefix length, one of which may be suitable for the particular radio channel being employed. However, an extension of the cyclic prefix results in wasted transmit energy and decreased spectral efficiency. In situations where transmit power is limited, e.g. by a regulatory body, wasted transmit energy equates to reduced range and/or data rate. In other cases the length of the cyclic prefix may be fixed, e.g. IEEE 802.11a/g, and conventional receiver techniques may fail under stress of the resulting inter-symbol and inter-carrier interference.

Any discussion of documents, devices, acts or knowledge in this specification, either within the text of this specification or, material incorporated herein by reference is included to explain the context of the invention. It should not be taken as an admission that any of the material forms a part of the prior art base or the common general knowledge in the relevant art in Australia, the United States of America or elsewhere on or before the priority date of the disclosure and claims herein.

SUMMARY OF INVENTION

It is an object of the present invention to overcome or mitigate at least one of the disadvantages of related art systems.

The inventor has recognised that in the case of relative mobility of the transmitter and receiver, and/or a time varying frequency offset, the conventional assumption that the channel is quasistatic may break down and in order to perform reliable equalization it may be necessary to track the channel and update the channel estimate throughout the duration of a packet.

According to a first aspect of the invention there is provided a method of data processing in a wireless communication network, the method comprising:
obtaining a model of a channel in the wireless communication network;
receiving a multi-carrier signal transmitted over the channel;

estimating, based on the received signal, parameters of the model of the channel; and updating the estimated parameters during reception of the signal.

According to a further aspect of the invention there is provided a method of data processing in a wireless communication network, the method comprising:

obtaining a model of a channel in the wireless communication network;

receiving a signal transmitted over the channel, the signal comprising a sequence of symbols carried on a plurality of sub-carriers;

estimating, based on the received signal, parameters of the model of the channel;

determining estimates of symbols from the received signal using at least one of the estimated model parameters; and updating the estimated model parameters during reception of the signal using at least one estimated symbol.

According to a further aspect of the invention there is provided a method of data processing in a wireless communication network, the method comprising:

obtaining a model of a channel in the wireless communication network;

receiving a signal transmitted over the channel, the signal comprising a sequence of symbols carried on a plurality of sub-carriers;

estimating, based on the received signal, parameters of the model of the channel, said estimating being performed in a time domain;

transforming at least one of the estimated parameters from the time domain to provide at least one transformed parameter in a second domain;

determining estimates of symbols from the received signal using the at least one transformed parameter; and updating the estimated model parameters during reception of the signal using at least one estimated symbol.

According to a further aspect of the invention there is provided an apparatus for processing data in a wireless communication network, the apparatus comprising:

at least one signal receiver operable to receive a multi-carrier signal transmitted over a channel in the network;

a boot-up estimator that estimates parameters of a model of the channel based on the received signal; and a tracking estimator that updates the estimated parameters during reception of the signal.

According to a further aspect of the invention there is provided an apparatus for processing data in a wireless communication network, the apparatus comprising:

at least one signal receiver operable to receive a signal transmitted over a channel in the network, the signal comprising a sequence of symbols carried on a plurality of sub-carriers;

a boot-up estimator that estimates parameters of a model of the channel based on the received signal;

a symbol estimator that determines estimates of symbols from the received signal using at least one of the estimated model parameters; and a tracking estimator that updates the estimated model parameters during reception of the signal using at least one estimated symbol.

According to a further aspect of the invention there is provided an apparatus for processing data in a wireless communication network, the apparatus comprising:

at least one signal receiver operable to receive a signal transmitted over a channel in the network, the signal comprising a sequence of symbols carried on a plurality of sub-carriers;

a boot-up estimator that estimates, in a time domain, parameters of a model of the channel based on the received signal;

a domain converter that transforms at least one of the estimated parameters from the time domain to provide at least one transformed parameter in a second domain;

a symbol estimator that determines estimates of symbols from the received signal using the at least one transformed parameter; and a tracking estimator that updates the estimated model parameters during reception of the signal using at least one estimated symbol.

According to a further aspect of the invention there is provided an apparatus for data processing in a wireless communication network, comprising:

means for obtaining a model of a channel in the wireless communication network;

means for receiving a multi-carrier signal transmitted over the channel;

means for estimating, based on the received signal, parameters of the model of the channel; and means for updating the estimated parameters during reception of the signal.

According to a further aspect of the invention there is provided an apparatus for data processing in a wireless communication network, comprising:

means for obtaining a model of a channel in the wireless communication network;

means for receiving a signal transmitted over the channel, the signal comprising a sequence of symbols carried on a plurality of sub-carriers;

means for estimating, based on the received signal, parameters of the model of the channel;

means for determining estimates of symbols from the received signal using at least one of the estimated model parameters; and means for updating the estimated model parameters during reception of the signal using at least one estimated symbol.

According to a further aspect of the invention there is provided an apparatus for data processing in a wireless communication network, comprising:

means for obtaining a model of a channel in the wireless communication network;

means for receiving a signal transmitted over the channel, the signal comprising a sequence of symbols carried on a plurality of sub-carriers;

means for estimating, based on the received signal, parameters of the model of the channel, said estimating being performed in a time domain;

means for transforming at least one of the estimated parameters from the time domain to provide at least one transformed parameter in a second domain;

means for determining estimates of symbols from the received signal using the at least one transformed parameter; and means for updating the estimated model parameters during reception of the signal using at least one estimated symbol.

According to a further aspect of the invention there is provided a computer program product comprising machine-readable program code recorded on a machine-readable recording medium, for controlling the operation of a data processing apparatus on which the program code executes to perform a method of data processing in a multi-carrier wireless communication network, the method comprising:

obtaining a model of a channel in the wireless communication network;

receiving a multi-carrier signal transmitted over the channel;

estimating, based on the received signal, parameters of the model of the channel; and updating the estimated parameters during reception of the signal.

The inventor has also identified that when preambles are employed in packet waveforms to assist with initial channel estimation, these may have autocorrelation properties that can lead to the appearance of false taps, where it appears to the channel estimator that there is a multipath reflection of a particular delay, while in fact there is not. Additionally, the inventor recognises that time domain correlation for every possible tap delay may be expensive in terms of processing requirements.

In a further aspect the present invention provides a method of selecting a signalling domain channel estimate tap in a wireless multicarrier communication network including the steps of:

comparing a signal parameter of a plurality of taps to a predetermined threshold;

providing signal processing to only those taps that are determined to have a signal parameter that exceeds the threshold.

In a further aspect the invention provides a method of generating a channel estimate in a wireless multicarrier communication network comprising the steps of:

generating a set of windowed convolutional channel estimator matrices based on at least a channel estimate Mean Squared Error and corresponding to optimised variables relating to a window of a symbol packet portion;

selecting one of the matrices based on a metric from a PHY state calculator;

applying the selected matrix to a received observation.

According to a further aspect, the invention provides method of generating a channel estimate in a wireless multicarrier communication network comprising the steps of:

generating a set of MMSE channel estimate matrices based on at least a channel estimate Mean Squared Error and corresponding to optimised variables relating to a window of a symbol packet portion and determined noise power;

selecting one of the matrices based on a metric from a PHY state calculator;

applying the selected matrix by a matrix-vector multiply operation to a received observation so as to determine a time domain channel estimate.

Preferably the method stores the vectors of the selected matrix for use in subsequent channel estimation process steps, for example in a shift register memory.

According to a further aspect, the invention provides a method of generating a local time domain channel estimate in a wireless multicarrier communication network comprising the steps of:

providing a current observation sequence;

providing a current data estimate sequence;

providing a data estimate state comprising data estimates of preceding received data;

inserting at least one the current data estimates into the data estimate state;

for at least one predetermined channel delay, correlating the current observation with the data estimate state using a window on the data estimate state offset from a previous symbol in the data estimate state by an amount substantially equal to the at least one predetermined channel delay.

According to a further aspect, the invention provides a method of generating a local time domain channel estimate comprising the steps of:

providing a current observation sequence;

providing a current data estimate sequence;

providing a data estimate state comprising data estimates of preceding received data;

inserting at least one the current data estimates into the data estimate state;

generating a MMSE matrix filter given by, $(A^*A+\sigma^2 I)^{-1} A^*$, from the windowed convolution matrix A of the data estimate state and a noise power hypothesis $\sigma^2$ from a PHY State Calculator;

applying the MMSE matrix to an observation sequence y via a Matrix-Vector multiply to determine a local time domain channel estimate given by $(A^*A+\sigma^{-2}I)^{-1}A^*y$ The method may further comprise determining an estimate of a transform domain channel according to:

$$\hat{R}=G_{rx}*\hat{H}G_{tx}$$

where the matrix $\hat{R}$, is an estimate of the matrix R defined as herein, which is calculated as above, using the matrix $\hat{H}$ which comprises an estimate of the time varying time domain channel matrix H defined as herein;

determining a Maximum Ratio Combiner sequence from an observation according to:

$$\hat{X}=\hat{R}*Y$$

where $\hat{R}$ is defined as above and $\hat{X}$ is an estimate of X defined as herein.

In further aspects the described methods may comprise:

determining an estimate of a time varying time domain channel according to:

$$\hat{R}=G_{rx}*\hat{H}G_{tx}$$

where the matrix $\hat{R}$, is an estimate of the matrix R defined as herein, which is calculated as above, using the matrix $\hat{H}$ which comprises an estimate of the time varying time domain channel matrix H defined as herein;

determining a MMSE sequence from an observation according to:

$$\hat{R}=(\hat{R}*\hat{R}+\sigma^2 I)^{-1}\hat{R}*Y$$

where $\hat{R}$ is defined as above, $\hat{X}$ is an estimate of X defined as herein, and $\sigma^2$, I and Y are defined as herein.

In one arrangement the elements $\hat{R}_j*[i]$ are replaced by an MMSE weighting factor matrix.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further disclosure, improvements, advantages, features and aspects of the present invention may be better understood by those skilled in the relevant art by reference to the following description of preferred embodiments taken in conjunction with the accompanying drawings, which are given by way of illustration only, and thus are not limiting to the scope of the present invention, and in which.

DETAILED DESCRIPTION

Figure 1:
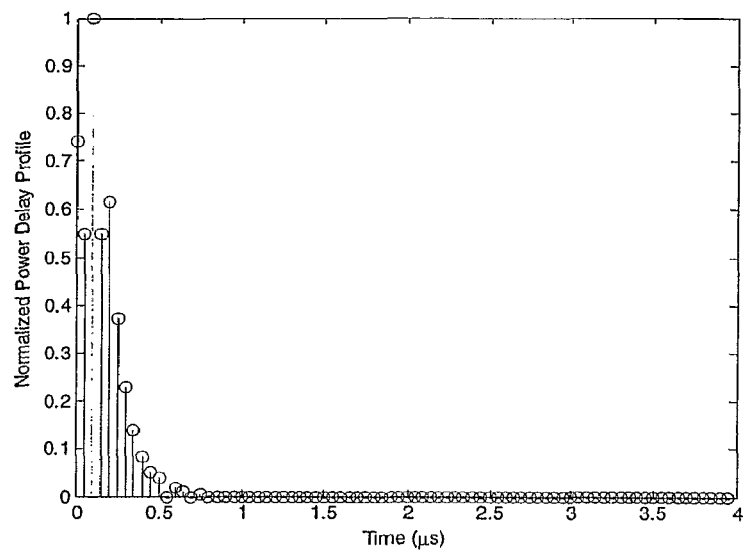
FIG. 1 graphically illustrates a normalised power delay profile for an indoor wireless channel.
Figure 2:
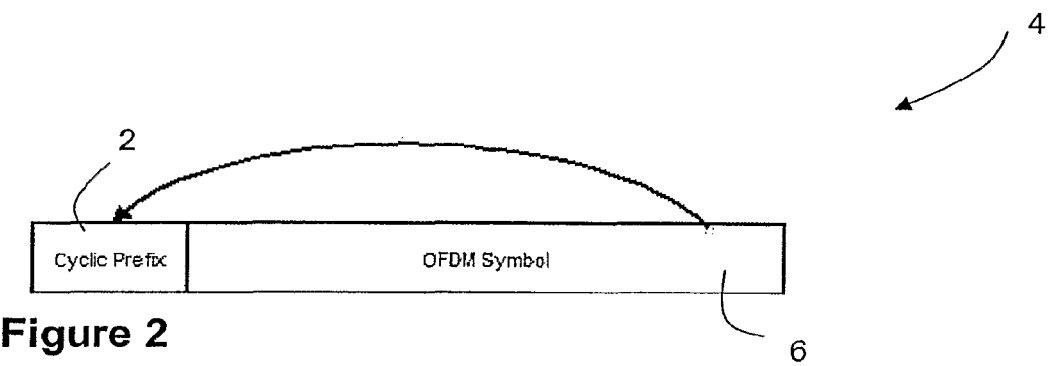
FIG. 2 illustrates the use of a cyclic prefix for a packet in an OFDM wireless communications network.
Figure 3A:
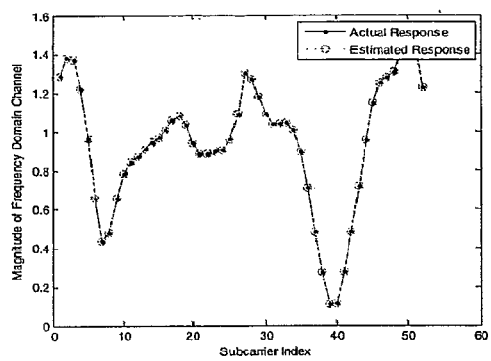
FIG. 3(a) graphically illustrates an actual and estimated frequency domain channel response for an indoor wireless channel.
Figure 3B:
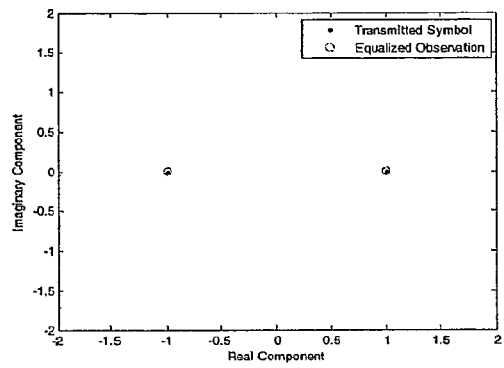
FIG. 3(b) graphically illustrates an equalised observation for an indoor channel.
Figure 4:
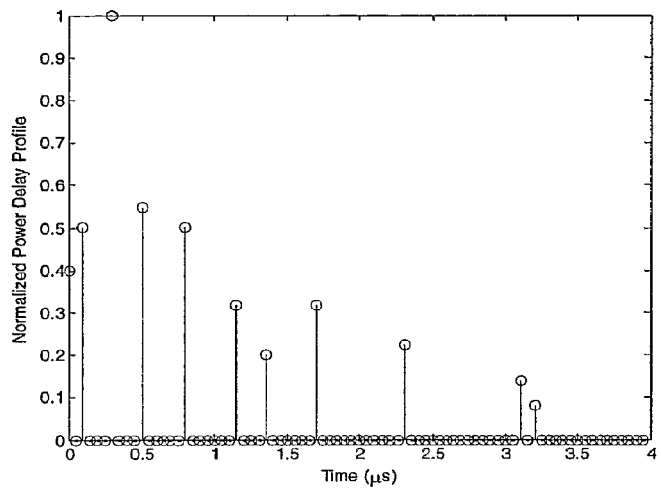
FIG. 4 graphically illustrates a normalised power delay profile for an outdoor wireless channel.
Figure 5A:
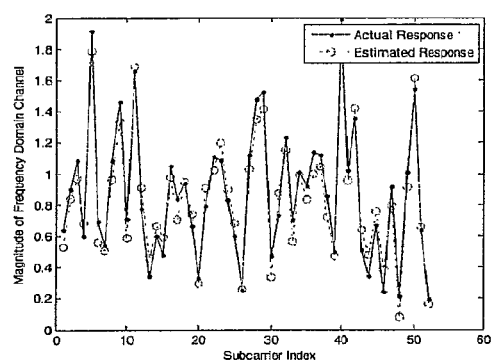
FIG. 5(a) graphically illustrates an actual and estimated frequency domain channel response for an outdoor wireless channel.
Figure 5B:
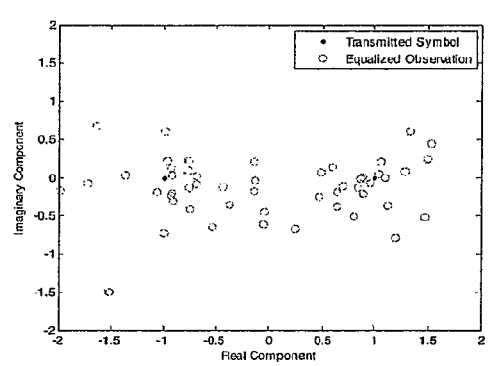
FIG. 5(b) graphically illustrates an equalised received observation for an outdoor wireless channel showing heavy distortion by ISI and ICI effects.

The following terms used in the description are given the following meanings:
SNR: Signal to Noise Ratio;
MMSE: Minimum Mean Square Error;
ZF: Zero Forcing
AWGN: Additive White Gaussian Noise
ICI: Inter Carrier Interference;
ISI: Inter Symbol Interference;
RMS delay spread: Root Mean Squared Delay Spread
FEC: Forward Error Correction
IC: Interference Cancellation
FFT: Fast Fourier Transform
IFFT: Inverse FFT
Multicarrier Communication Model The model presented in this section is employed throughout the description. It may be applied to any multicarrier communication system which simultaneously transmits data in multiple orthogonal signalling dimensions, e.g. an OFDM system. In the OFDM case described herein, processing takes place in two domains, the time domain and the frequency domain, with conversions between domains as required.

Consider a multicarrier channel which is subject to ISI and/or ICI. Such a channel may be modelled as described in eqn 1.

$$Y = G^*_{rx} H G_{tx} X + n \qquad 1$$

where

H is a time-domain linear-convolution matrix used to model the linear convolution of the transmitted signal with the multipath radio channel;

X is a vector representing L transmitted frequency domain symbols;

Y is a vector representing the L multicarrier symbols observed at the receiver, in the frequency domain;

n is additive white Gaussian noise;

$G_{tx}$ is the transmit-side transform matrix, which translates transmitted multicarrier symbols from the frequency domain into the time domain; and $G^*_{rx}$ is the receive-side transform matrix which translates received time-domain multicarrier symbols into the frequency domain. Here, and throughout this document, the operation A* represents the conjugate transpose of the matrix (or vector) A.

It is assumed that each multicarrier symbol in X is generated using a transmitter that uses symbol mapping in the frequency domain. The transmitter may have, for example, the format shown in transmitter 100 of FIG. 6. Here a set of input information bits 102 is encoded using a FEC encoder 104, and the encoded bits are interleaved by interleaver 106, prior to being mapped by symbol mapper 108 onto symbols in the frequency domain. A domain converter 110 then translates the symbols to provide an output 112 for transmission in the time domain (e.g. the domain converter 112 may be an IFFT in OFDM). The receiver arrangements described below are not tied to specific transmitters, provided that receiver side components are consistent with coding constraints used at the transmitter side. For example, if a FEC code is employed in encoder 104 then the decoder used at the receiver will assume the same code constraints as those assumed by the encoder 104 at the transmitter 100.

The extended transform matrices, $G_{tx}$ and have dimensions which scale with the number of multicarrier symbols, L, e.g. for a length L packet. These matrices are constructed from the transform matrices $F_{tx}$ and $F_{rx}$* respectively, via a Kronecker product with the L×L identity matrix. The individual elements of the matrices which are used to translate signals between domains are determined by the type of multicarrier system being employed. For example, when modelling a conventional N-subcarrier OFDM system, translation occurs between the time domain and frequency domain, and each transmitted time domain symbol is cyclic prefixed with some number of samples, C, of itself. In this case the model employs $$F_{tx} = \begin{bmatrix} W_C \\ W_N \end{bmatrix}$$

and $$F_{rx} = \begin{bmatrix} Z \\ W_N \end{bmatrix},$$

where $W_N$ represents the N×N Fourier matrix, having elements $$w_{i,k} = e^{\frac{2\pi\sqrt{-1}\,(i-1)(k-1-N/2)}{N}} \Big/ \sqrt{N},$$

where i and k represent row and column number respectively, both being indexed starting from 1. $W_C$ contains the last C rows of $W_N$. The guard samples may be discarded at the receiver, and this is modelled by the Z component of $F_{rx}$, which has the same dimensions as $W_C$ and contains zero-valued elements. Any OFDM-symbol timing-error that exists between the transmitter and receiver is assumed to be absorbed into the time-domain radio-channel model. Another example model occurs when the cyclic prefix is replaced by an empty guard at the transmitter. In this case both $F_{tx}$ and $F_{rx}$ are equivalent to the $F_{rx}$ matrix shown for the OFDM example above. Another example occurs when no cyclic prefix or guard interval is used, in which case both $F_{tx}$ and $F_{rx}$ are equivalent to the Fourier matrix $W_N$.

In order to provide insight into the effects of inter-symbol and inter-carrier interference, the channel transfer function may be represented in the absence of noise by the matrix R, as defined in Eqn 2.

$$R = G^*_{rx} H G_{tX} \qquad 2$$

Consider the model for a conventional OFDM system, with a static time domain channel having length that is constrained to within one prefixed symbol period. The matrix R may be constructed as shown in Eqn 3, for an example case of L=4.

$$R = \begin{bmatrix} R_0 & & & \\ R_1 & R_0 & & \\ & R_1 & R_0 & \\ & & R_1 & R_0 \end{bmatrix} \qquad 3$$

The component matrix $R_0$ is constructed according to Eqn 4, where $H_0$ is taken from the first N+C rows and the first N+C columns of H.

$$R_0 = F^*_{rx} H_0 F_{tx} \qquad 4$$

Similarly $R_1$ is constructed according to Eqn 5, where $H_1$ is taken from rows N+C+1 through 2(N+C), and the first N+C columns of H.

$$R_1 = F^*_{rx} H_1 F_{tx} \qquad 5$$

Using the above definitions, each received symbol may be expressed as shown in Eqn 6, where bracketed terms indicate the symbol period index.

$$Y[i] = R_0 X[i] + R_1 X[i-1] + n[i] \qquad 6$$

The model may be extended to the case of a time-varying channel, by allowing of the content of $R_0$ and $R_1$ to change with time, as shown in Eqn 7, in which the terms are indexed with respect to the symbol period index of the received OFDM symbol observation.

$$Y[i] = R_0[i] X[i] + R_1[i] X[i-1] + n[i] \qquad 7$$

Additionally in the case where the delay spread extends beyond N+C we may generalise the interference model to $$Y[i] = \sum_j R_j[i] X[i-j] + n[i]$$

The model may be also be adapted to include special OFDM symbol constructions, e.g. in the case of the long preamble dictated by the IEEE 802.11a standard. This standard specifies that data symbols are to be constructed in the manner described above, with each 64 sample time domain OFDM symbol being prefixed with a copy of its final 16 samples. In contrast, the long preamble may be considered as two replicated back-to-back OFDM symbols, each of 64 samples length, with a cyclic prefix of length 32 samples prefixing them. The long preamble may be incorporated into the model, over two OFDM symbol periods, using the following special transform matrices.

$$F_{txLP} = \begin{bmatrix} W_{C32} & \\ & Z_{96\times 64} \\ W_{64} & \\ Z_{64\times 64} & W_{64} \end{bmatrix}$$

and $$F_{rxLP} = \begin{bmatrix} Z_{32\times 64} & \\ & Z_{96\times 64} \\ W_{64} & \\ Z_{64\times 64} & W_{64} \end{bmatrix},$$

where $W_{64}$ represents the 64×64 Fourier matrix and $W_{C32}$ contains the last 32 rows of $W_{64}$. Component matrices which contain zero-valued elements are denoted $Z_d$, where d specifies their dimensions. The double symbol length contribution to R is then constructed as follows, where $H_{LP}$ is taken from the first 160 rows and the first 160 columns of H.

$$R_{LP} = F^*_{rxLP} H_{LP} F_{txLP}$$

Figure 6:
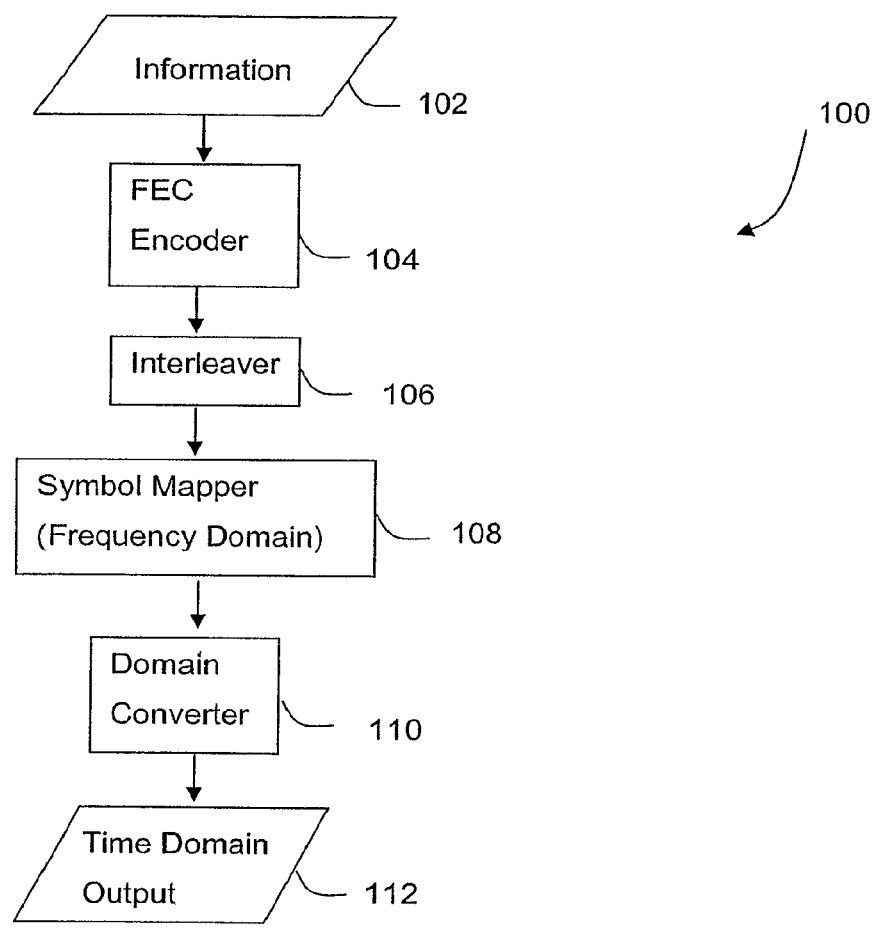
FIG. 6 is a block functional diagram of an exemplary transmitter used for transmitting signals in a wireless multi-carrier communication system.
Figure 7:
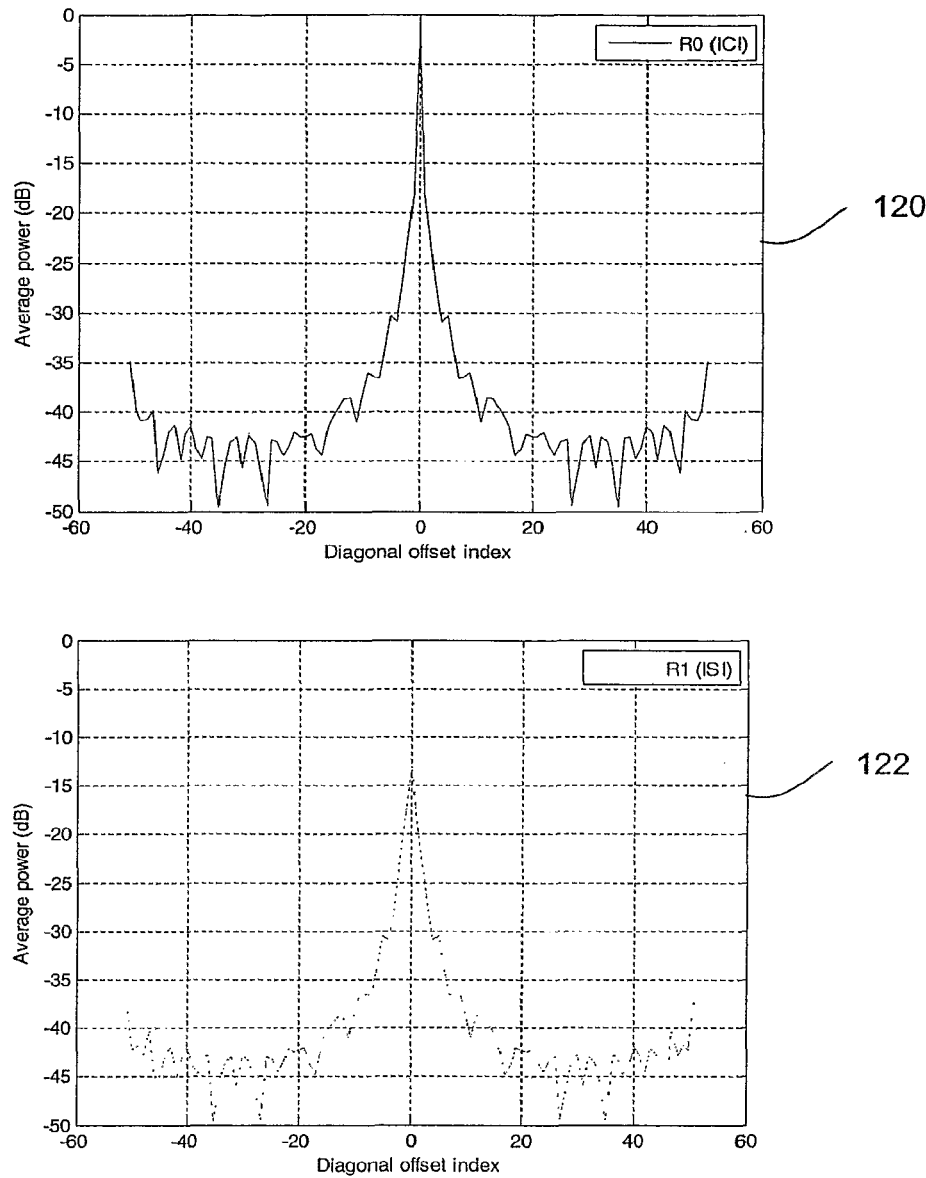
FIG. 7 is a graphical illustration of average power distribution of diagonal components of a matrix representation of a channel transfer function representing Inter-Carrier Interference (ICI) and Inter-Symbol Interference (ISI), respectively.

FIG. 6 shows the average power of the diagonals of $R_0$ and $R_1$, indexed from the main diagonal at zero, for an example model representing an IEEE 802.11a OFDM system being employed in an outdoor environment. Graph 120 shows the average power of $R_0$, and graph 122 shows the average power of $R_1$. The IEEE 802.20 Typical Urban (Case-IV) channel model [4] was used to generate H for the purpose of the example.

The main diagonal of $R_0$, denoted $h_0$, represents the direct channel contribution, and the non-principal diagonals of $R_0$ model inter-carrier interference (ICI) from other subcarriers within the same received symbol.

The components of $R_1$ model inter-symbol interference (ISI) from the previous symbol, the most significant being the main diagonal, denoted $h_1$.

The length of the IEEE 802.20 (Case-IV) delay spread is 3.2 μs, which is well in excess of the 0.8 μs of cyclic prefix protection offered by the IEEE 802.11a symbols. As a result, significant levels of both ISI and ICI are observed in graphs 120 and 122. However, both $R_0$ and $R_1$ are diagonally dominant, and the model provides some insight into which channel components present the most significant contribution to the distortion of the received symbol. The model suggests the following:

A significant amount of the transmitted symbol energy may be recovered for the symbol, by correctly combining received observations for the symbol and the (i+1)$^{th}$ symbol, using $h_0$ and $h_1$ respectively.

A significant amount of interference may be removed from the itn symbol after the combining of received observations, by correctly cancelling contributions from the $i^{th}$ symbol, the $(i-1)^{th}$ symbol and the $(i-1)^{th}$ symbol, using $h_0$ and $h_1$ respectively.

Any non-principal diagonal components of $R_0$ and $R_1$ may also be employed for combining and cancellation, however diminishing returns are to be expected when moving outwards from the principal diagonals of $R_0$ and $R_1$. The symmetry about the main diagonals of $R_0$ and $R_1$, and the equality of the average off-diagonal power between $R_0$ and $R_1$ at the same offset index, implies that the components present themselves as equal candidates for combining or cancellation in groups of four.

In the description hereinafter, embodiments of the present invention are presented in the context of an OFDM system, and hence the transformations are undertaken between the time domain, and the frequency domain. These embodiments of the present invention may be equally applicable to other transformations. Furthermore, embodiments of the present invention are applicable to both single antenna and multi-antenna systems. The results presented in the discussion that follows focus upon the single antenna case, however detail is provided regarding extensions of the described embodiments of the present invention to multi-antenna cases. The applicability of embodiments of the invention to single antenna scenarios makes them especially valuable in cases where multiple-antenna systems cannot be employed, e.g. some portable devices. The inventor also notes that the described arrangements may find usefulness in many digital communication systems, including the following:

IEEE 802.11, 802.16 & 802.20;
OFDM and OFDMA;
WiBro (Wireless Broadband);
UWB 802.15, LTE 3G;
MC-CDMA;
DVB (Digital Video Broadcasting),
DSL and other wired multicarrier standards e.g. Home-Plug.

System Level Description

Figure 8:
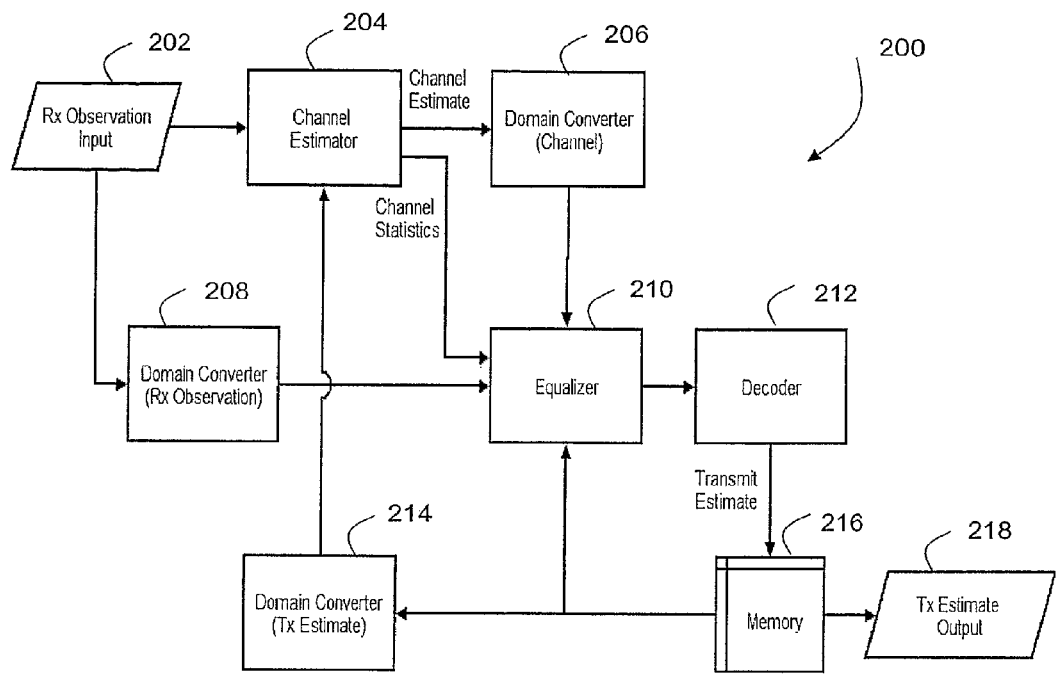
FIG. 8 is a block functional diagram representing a receiver system in accordance with a preferred embodiment of the present invention.

Advanced receiver techniques for long-delay spread OFDM communication systems are proposed, using the receiver structure 200 shown in FIG. 8. The functional blocks 204-214 of FIG. 8 may be implemented as software running on a receiver device that may include one or more microprocessors. Alternatively, the functional blocks 204-214 may be implemented as customised hardware provided in a receiver device, for example using one or more Digital Signal Processors (DSPs), Field Programmable Gate Arrays (FPGAs) or Application Specific Integrated Circuits (ASICs).

It is assumed that data is transmitted in packets of OFDM symbols, and that each packet contains a preamble that is known to the receiver 200. The received observation input 202 is provided to a channel estimator 204 and to domain converter 208. As described below with reference to FIG. 9, the channel estimator 204 performs channel estimation boot-up in the time domain. The channel estimate is then tracked, during packet reception, by the channel estimator block 204. The channel estimate is provided to domain converter 206, which transforms the time-domain estimate into a frequency-domain channel estimate, as described in more detail below. The channel estimator 204 may also generate channel statistics that are provided to equaliser 210.

The domain converter 208 transforms the input 202 from the time domain to the frequency domain and provides the transformed observation to the equaliser 210. Domain converter 208 may use a Fast Fourier Transform (FFT).

The equalizer block 210 uses the received observation (transformed by domain converter 208), the channel estimate (transformed by domain converter 206), and an estimate of transmitted symbols (fed back from memory 216 and decoder 212), to remove distortion due to channel effects. The resulting output of equaliser 210 is passed to a decoder 212, which provides an updated estimate 218 of the transmitted data. The updated estimate may be stored in a storage device such as memory 216. The equaliser 210 is described in more detail with reference to FIGS. 14 and 15. The equalizer 210 and decoder 212 together provide a symbol estimator that outputs an estimate of the transmitted data.

Figure 16:
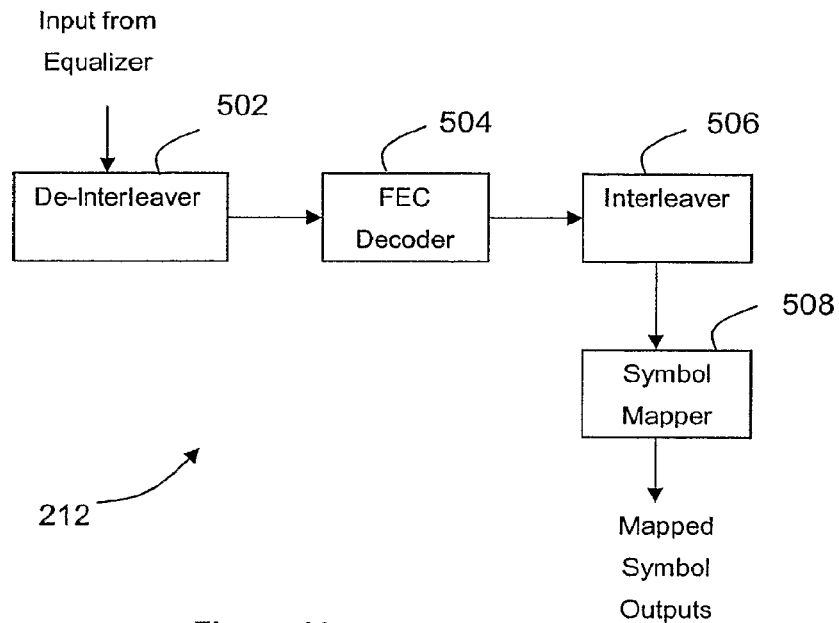
FIG. 16 is a block functional diagram of the decoder block of FIG. 8 having an FEC decoder that outputs a full codeword sequence estimate.

The process may then be iterated. Decoder outcomes 218 are employed in subsequent execution of the channel estimation 204 and equalization blocks 210. The estimated output 218 is in the frequency domain and so domain converter 214 may be used to convert the estimated output 218 into the time domain for use by the channel estimator 204. Domain converter 214 may use an Inverse Fast Fourier Transform (IFFT). The update rate of the iteration may, for example, be per sample, per OFDM symbol or per FEC block. The iterative process may run until a maximum number of iterations has been reached, or iteration may be stopped early. In one embodiment, the stopping criteria may be controlled by an FEC decoder that is a functional subunit of decoder 212. For example, the FEC may report a valid decoding, or it may report a soft belief that the decoding is valid, and that belief may be above some threshold value. In another embodiment the stopping criteria may be controlled using a checksum, e.g. a cyclic redundancy check, which is performed across the FEC decoded outputs. Examples of the decoder 212 are described below with reference to FIGS. 16 and 17.

The domain converter blocks 214, 206 and 208 are used to translate signals between the time domain and the frequency domain. Domain converters 208, 214 user may use FFT and IFFT techniques respectively. The techniques used in domain converter 206 are described in more detail below.

In another embodiment, the receiver system has multiple receive antennas, and an individual channel estimator block 204 then exists for each receive antenna.

In another embodiment, the system has multiple receive antennas and some number of channel estimator blocks exist in the receiver, is the number of channel estimator blocks being less than the number of antennas. In this case the available channel estimator block(s) may be used to process incoming signals from a plurality of antennas, on a time-multiplexed basis.

In embodiments that have multiple receive antennas, multiple channel domain converter blocks 206 may also exist. In the case when the number of domain converter blocks 206 equals the number of channel estimator blocks 204, then each channel estimator block is connected to a separate domain converter block. In the case when the number of channel estimator blocks exceeds the number of domain converter blocks, the domain converter blocks are used to convert channel converter block outputs on a time-multiplexed basis. All domain converter block outputs are presented as input to the equalizer block 210, where they are combined as described in the equalizer block section below.

Component Level Description

Channel Estimator

Figure 9:
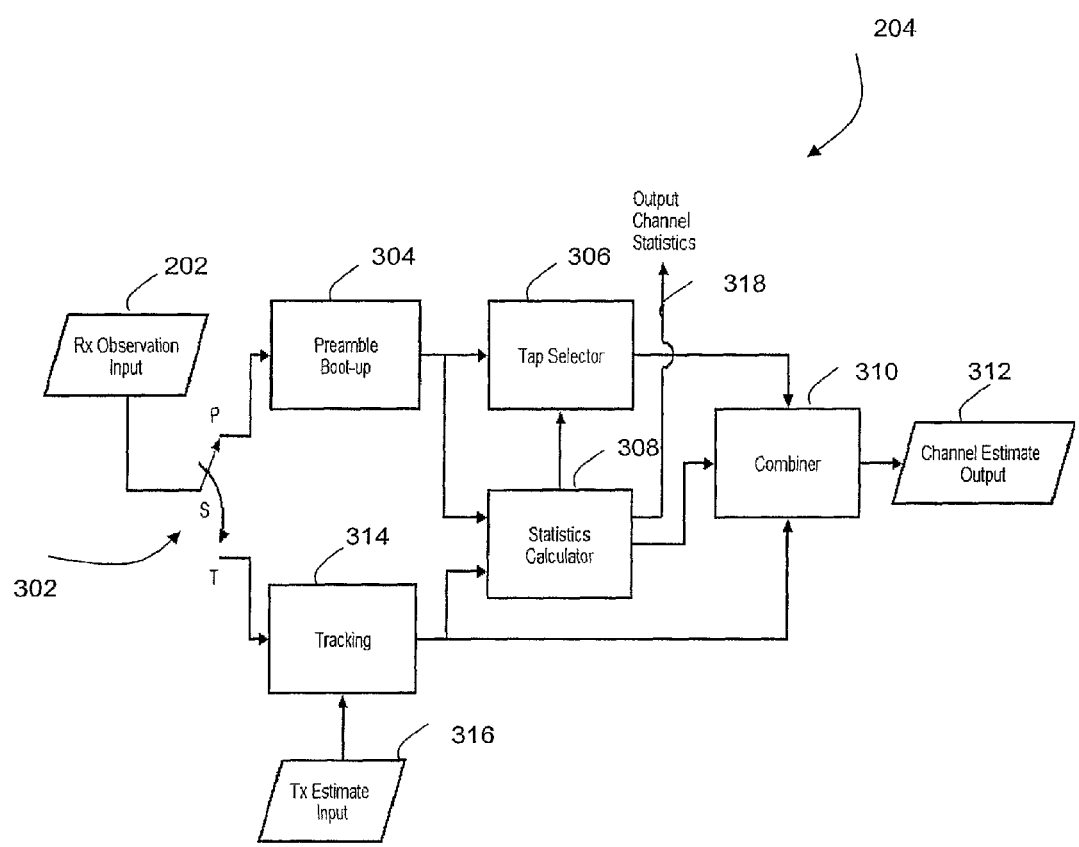
FIG. 9 is a block functional diagram representing a channel estimator component of the receiver of FIG. 8.

The channel estimation block 204 is expanded in FIG. 9 and each functional block is described in the text that follows. The channel estimation block has a switch 302 that determines whether the observation input 202 is provided to a preamble boot-up block 304 or a tracking block 314.

Boot-Up Processing

With reference to FIGS. 8 and 9, an initial estimate is generated via a preamble boot-up process performed by boot-up block 304, which operates when switch S 302 is in the P position. This process uses the received observation 202, and knowledge of the transmitted preamble to produce an estimate of complex time-domain channel taps. Examples of methods for providing the initial estimate are described below. It is common for a section of samples at the beginning of the received observation to be distorted, due to automatic-gain-control (AGC) events, and in such a case that section should be discarded.

Linear Filter

An initial estimate of the time domain channel, having length m, may be generated using Eqn 8.

$$\hat{h}_t = (A^*A + \sigma^2 I)^{-1} A^* y \qquad 8$$

where

Figure 10:
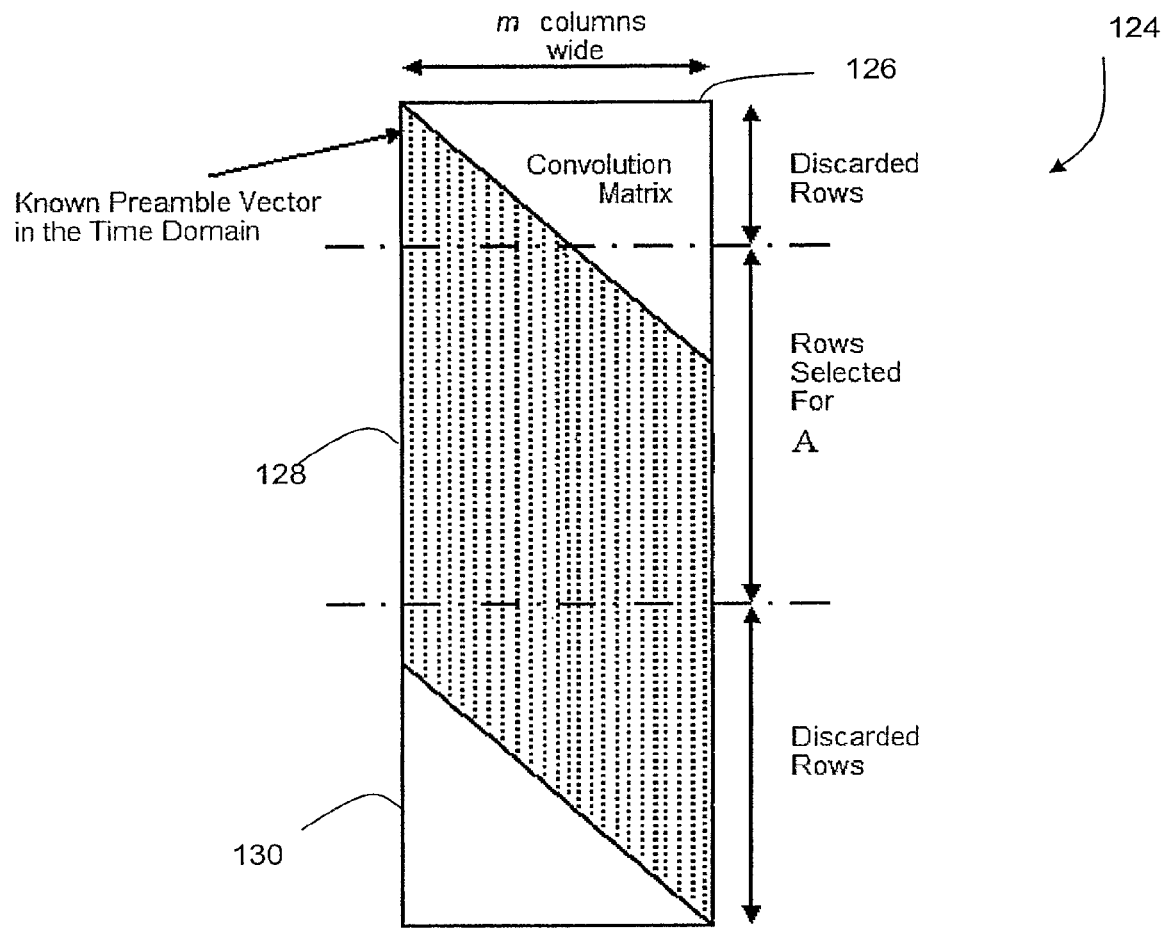
FIG. 10 illustrates a construction of a matrix A which may be used to build an MMSE filter that is employed during a channel estimation boot-up in the channel estimator of FIG. 9.

A is a cropped linear convolution matrix, of width m columns, representing the known transmitted preamble in the time domain. The matrix A is obtained by selecting a window of rows 128 from the convolution matrix 124, as shown in FIG. 10. Rows 126 and 130 are discarded from the convolution matrix 124. The window size and position used for selecting A may be selected offline, e.g. according to the following criteria:
- Minimization of the mean-squared error of the channel estimate;
- Avoidance of early preamble samples due to potential AGC distortion;
- Reduction of implementation complexity.

I is the m×m identity matrix y is a vector of time domain samples from the received observation, time aligned to the first column of samples in A.

$\sigma^2$ is the minimum mean-squared error (MMSE) noise scaling factor, and is normally set to the power of the noise perturbing the observation y. Selecting $\sigma^2 = 0$ generates a Zero Forcing (ZF) filter.

The optimal setting for $\sigma^2$ may be calculated using the received signal noise power, by recalculating of the filter matrix $(A^*A + \sigma^2 I)^{-1} A^*$ at different SNR operating points. Alternatively, by assuming a fixed value for $\sigma^2$, the filter matrix may be precomputed and stored. Moreover, several matrix instances may be stored in a lookup table, for different values of $\sigma^2$, and used for different regions of SNR operating points.

In some embodiments the preamble sequence may contain a section of repeated OFDM symbols, which have a set of zero-valued subcarriers in the frequency domain. Such a repetition of OFDM symbols can result in the final symbol in the series being well guarded against ISI and ICI distortion, due to the symbols that precede it acting as a long cyclic prefix. An estimate of the received noise power may then be calculated in the frequency domain, from the variance of the received values at subcarriers which correspond to the zero-valued subcarriers at the transmitter. Such an example occurs in the case of the 802.11a waveform, where the last 64 time domain samples of the short preamble are protected by an effective cyclic prefix of length 64 samples. For example, at a bandwidth of 20 MHz this corresponds to a protection of 3.2 µs.

In some embodiments the transmit waveform may include a sequence known to the receiver 200, at a point in the packet that is not necessarily aligned with the start of the packet. An example of such a transmission is the midamble sequence dictated in the 802.16 standard. An estimate of the channel can be obtained during packet reception in such cases, by employing the boot-up processing 304.

Sliding Correlator

The boot-up unit 304 may calculate an initial channel estimate using a sliding correlator (matched filter), by correlating the received observation 202 in the time domain, with a section of stored time-domain preamble samples.

Using the definitions of the previous section regarding the Linear Filter we may state the Sliding Correlator output as $$\hat{h}_t = A^* y \qquad 9$$

Techniques known for implementing linear convolution (as shown above) using cyclic convolution techniques (based on FFTs) may be employed here to reduce complexity.

In calculating the channel estimate using equation 9, an accumulator may be used for each of the bins used. The values stored in the accumulators may be subsequently used by the tracking module 314.

In cases where the time-domain preamble is periodic, e.g. as dictated by the IEEE 802.11a wireless standard, the sliding correlator may produce false taps when long-delay-spread channels are being estimated. These false taps occur due to an unfavourable autocorrelation sequence of the time-domain preamble. In such cases the linear MMSE filter approach described above can provide a more accurate channel estimate than the sliding correlator, by simultaneously suppressing noise and autocorrelation spikes.

Integrated MMSE and Sliding Correlator

As can be seen by comparing equations 8 and 9 the sliding correlator forms part of the Linear Filter (MMSE) front end. The MMSE output may be calculated from the Sliding Correlator output by multiplication of the channel estimate vector by the decorrelating matrix $(A^*A + \sigma^2 I)^{-1}$. This matrix could be computed from time to time. An alternative approach is to use the average matrix $E_A[(A^*A + \sigma^2 I)^{-1}]$ which we approximate as $(E_A[A^*A] + \sigma^2 I)^{-1}$. The matrix $E_A[A^*A]$ has structure that allows approximate implementation via linear convolution. The filter employed is that corresponding to the centre rows of $E_A[A^*A]$. In typical OFDM waveform implementations the output of the IFFT may be non-white and the filter described above accounts for this correlation, reducing the effects of using non-white training sequences for channel estimation.

Channel Statistics Calculator

The channel statistics calculator block 308 receives the output of the preamble boot-up block 304 and the tracking block 314 and provides an estimate of the average power, and RMS delay spread of the channel, using the length m time domain channel estimate, $\hat{h}_t$. The output 318 of the statistics calculator block 308 is provided to combiner 310 and tap selector 306 and also to equaliser 210.

The delay spread result is given with respect to the OFDM symbol period. The average power is calculated according to Eqn 10. The RMS delay spread is calculated according to Eqn 11, where $\hat{h}_{ti}$ represents the $i^{th}$ tap of the channel estimate.

$$P_{av} = \sum_{i=0}^{m-1} |\hat{h}_{ti}|^2 / m \qquad 10$$

$$\text{RMS Delay Spread} = \sqrt{\frac{\sum_{i=0}^{m-1} i |\hat{h}_{ti}|^2}{\sum_{i=0}^{m-1} |\hat{h}_{ti}|^2}} \qquad 11$$

Results from the statistics calculator 308 may be used by control mechanisms, such as the tap selection process described below, or for diagnostics. In some implementations of the receiver 200 the calculator block 308 may be omitted to reduce overall implementation complexity.

Tap Selection

The tap selector block 306 receives outputs from the preamble boot-up block 304 and statistics calculator 308 and compares the power of each estimated time-domain tap with a threshold value. The tap selector 306 discards those taps with power below the threshold. The threshold may be some fixed value, or may be some function of the estimate, which is set dynamically as the estimate is updated, e.g. via a lookup table. For example, the threshold power may be set at some percentage of the maximum tap power. Alternatively, the threshold may be set according to some function of the average or maximum power of the channel estimate, e.g. some scaling of the square root of the average power.

For each tap which passes the threshold test, the tap selector 306 may also output a group of taps either side. The size of the groups may be fixed or may be calculated dynamically, e.g. using some function of the RMS delay spread statistic provided by the statistics calculator 308.

In other embodiments, some maximum number of taps which meet the criteria may be selected. For example, where the number of taps selected is a predetermined fixed value, or where the number of selected taps is based upon a predetermined statistic of the channel estimate, such as, for example, some function of the RMS delay spread statistic.

In another embodiment, the tap selection process may be locked at some point in time. The lock time may be predetermined, or may be chosen dynamically, e.g. the lock time may be obtained from a lookup table during packet reception, according to one or more receiver state metrics, such as, for example, an estimate of noise power in the received observation In other embodiments, a tap selector block may be placed after the channel estimate combiner block 310 in addition to, or instead of, the tap selector 306 placed after the preamble boot-up block 304, and/or placed after the channel tracking block 314.

Tap selection may provide the advantage of reduced implementation complexity for processes which make use of the channel estimate. Tap selection can also provide a smoothing effect in the frequency domain representation of the channel.

Figure 11:
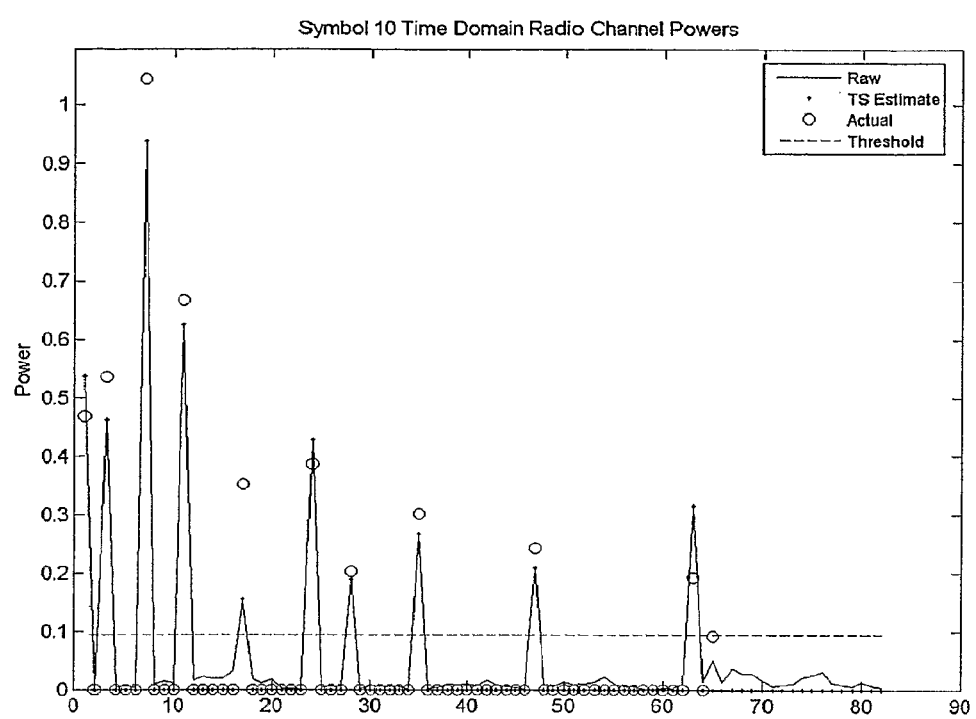
FIG. 11 illustrates the result of a tap selection near the start of test wireless transmission.
Figure 12:
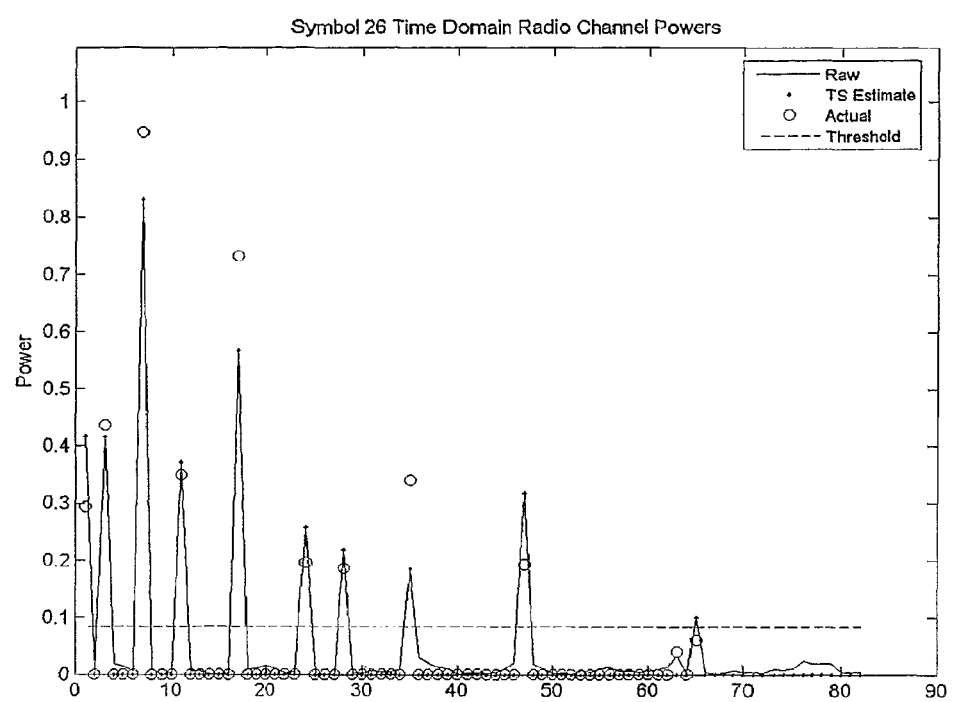
FIG. 12 illustrates the result of a tap selection near the end of a test wireless transmission.

With reference to FIG. 11 and FIG. 12 we show the result of tap selection near the start and end of an IEEE 802.11 test transmission operating at 5 GHz. FIG. 11 shows the time-domain radio-channel power of symbol 10 and FIG. 12 shows the time-domain radio-channel power of symbol 26. This example assumes an IEEE 802.20 Case IV channel model, with relative receiver mobility of 230 kmph. We see that the actual radio channel (indicated by circles) changes significantly between the two OFDM symbols (which are separated by 15 OFDM symbols, i.e. 60 µs). We also note that the tap selector has selected different taps (indicated by dots) for admission to the Time-Frequency domain converter 206. For example, the 63rd tap has fallen below the threshold value in symbol 26.

Channel Estimate Tracker

Upon completion of preamble processing, the channel estimator 204 shifts switch S 302 to the T position and the channel estimate tracking process of block 314 is enabled. The tracking process of block 314 and combining process of block 310 (described below) allow the receiver 200 to operate in the presence of a time-varying channel, such as that encountered during relative mobility between the transmitter and receiver, and/or to be robust to the presence of time-varying frequency offset and other RF effects. The tracker 314 makes use of the received observation 202 and a time-domain estimate 316 of the transmitted data for a particular OFDM symbol. The estimate 316 is fed back from receiver components 214, 216, 212 external to the channel estimator 204. The output of the tracker 314 is provided to the statistics calculator 308 and the combiner 310 and may also be provided to a tap selector.

From time to time a set of up to m accumulators, indexed by delay bin in the time-domain channel estimate, is updated with the next segment of time domain observation and time-domain training. The time-domain training could be supplied from many sources such as FEC decoder outcomes, pilot, preambles or hard decisions on the symbols. Thus, the time-domain training may be symbol estimates X fed back to the tracker 314 from the decoder 212 in the iterative structure of FIG. 8.

Figure 13:
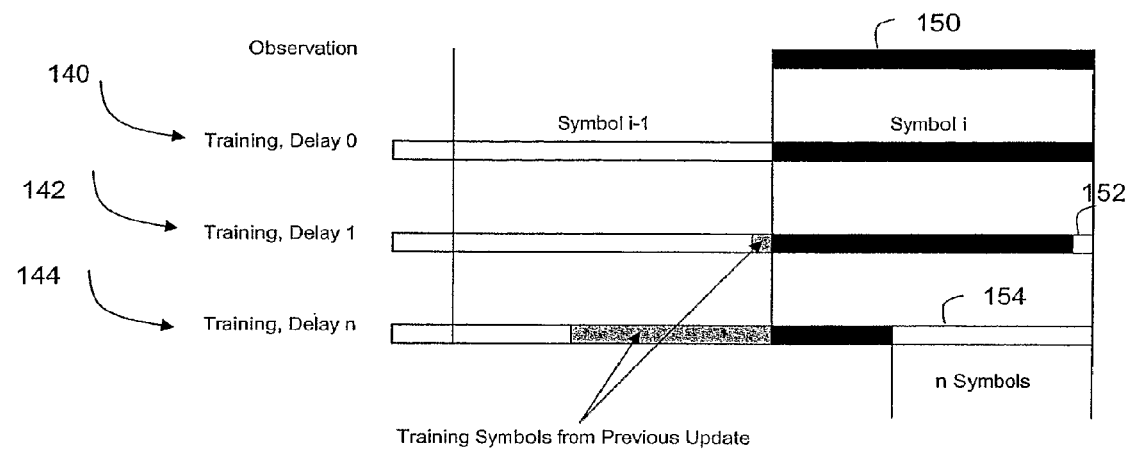
FIG. 13 illustrates windows of an observation and training sequences employed in a sliding-window time-domain channel estimator in the channel estimator of FIG. 9.

The new training symbols are pushed onto the head of a buffer containing all previous training symbols as illustrated in FIG. 13, which shows three bins 140, 142, 144 corresponding to delays of zero, 1 and n symbols respectively. The correlation update for each delay bin 140, 142, 144 is then calculated by correlating the observation 150 with a window of the training buffer of the same length as the observation 150 (the window length is shown as shaded elements in FIG. 13). The window of the training buffer is offset from the end of the buffer by an amount equal to the delay bin under test and is accumulated into the partial correlation result. For example, the offset of bin 140 is zero symbols, the offset 152 of bin 142 is one symbol and the offset 154 of bin 144 is n symbols. The accumulation may be executed using an auto-regressive filter, such as that described in relation to the Channel Estimate Combiner 310, which follows.

The buffer may be used in a hand-over from the boot-up estimator 304 to the tracker 314. In the hand-over the training changes from the known preamble to estimated transmitted symbols, delivered for example by the decoder 212.

A selected subset of taps may be tracked, as dictated by the tap selection block 306, thus reducing implementation complexity.

The channel estimate output by the tracker 314 may be calculated using the accumulators, resulting in sliding window correlation outputs, and may also be further processed in a manner similar to that described above for the boot-up process of block 304, resulting in LMMSE or ZF outputs.

Sliding window correlation may be implemented using an accumulator and a shift register of length equal to the window length or using an auto-regression.

The LMMSE filter described in the boot-up process is of particular interest in tracking mode. The sliding correlator is low complexity but may have training sequence autocorrelation artefacts that degrade channel estimation quality. The subsequent application of the decorrelating filter, either in matrix or linear convolution form may correct this shortcoming.

The transition from Boot-Up to Tracking mode may be achieved by assuming that the boot-up processor 304 had used the raw sliding correlator A*.

As mentioned above, the tracker 314 may use values stored in accumulators by the boot-up module 304 during the initial estimation of the channel parameters.

In another embodiment, techniques known for estimating the channel in the frequency domain may be employed by tracker 314 to track the channel. For example, the channel estimate in the frequency domain may be obtained by division or conjugate multiplication of the received frequency domain observation (e.g. the output of converter 208), by an estimate of the transmitted sequence in the frequency domain. The estimate of the transmitted sequence may be provided by the FEC decoder 504, 510, as described in the Decoder block description with reference to FIGS. 16 and 17. Some frequency domain estimation techniques are described, for example, in published application US2004/0264561 in the name of Alexander et al, filed 23 Jul. 2004.

In another embodiment the channel-estimate tracking method used by tracker 314 may change from one technique to another at some point during reception of a packet. For example, the method used by the tracker 314 may change from a time-domain estimation to a frequency-domain estimation at some point in time during packet reception, using any of the channel estimation methods described above. In one embodiment, the point in time at which the method is changed may be a fixed delay with respect to the start of packet reception. In another embodiment, the point in time is determined dynamically by some system state metric. For example, the system state metric may be a statistic obtained from the time domain channel estimate, e.g. some function of the delay spread calculated by statistics calculator 308.

Channel Estimate Combiner

The channel estimate combiner 310 has as inputs the outputs of tap selector 306, tracker 314, and statistics calculator 308.

The channel estimate combiner 310 provides an output that filters a current estimate in light of previous estimates. In one arrangement the combiner 310 may use memory to provide an auto-regressed update of the channel estimate, $\hat{h}_t$, with the new channel estimate from the channel estimate tracker block 314, $\hat{h}_{t(new)}$, according to Eqn 12.

$$\hat{h}_t = \alpha \hat{h}_{t(new)} + (1-\alpha) \hat{h}_t \qquad 12$$

The auto-regression factor, $\alpha$, is given a value between zero and one. This value may be fixed or may change over time. For example, a may be updated over time via a lookup table, or updated adaptively according to some system state metrics. Moreover, a higher order filter may be used, to combine several states of the channel estimate, with an independent auto-regression factor assigned to each state.

In another embodiment, individual taps in the time-domain channel estimate, or groups of taps, may be assigned different weighting factors, and may be updated as described for the cases above.

The output of the channel estimate combiner 310 is a time-domain channel estimate 312, which is output to the domain converter 206.

Domain Converters

The domain converters 206, 208, 214 are used to translate signals between the time domain and frequency domain. Embodiments of the present invention described here are presented in the context of an OFDM system. Other embodiments may also be derived for different models that use conversions between different domains.

Time Domain—Frequency Domain (Rx Observation) 208

The received observations 202 are converted, on a per-OFDM symbol basis, into the frequency domain using the standard FFT method, discarding the cyclic prefixed guard portion of the symbol.

Time Domain—Frequency Domain (Channel) 206

In order to drive the equalization block 210, frequency domain versions of both $h_0$ and $h_1$ may be required. Furthermore, off-diagonal components of $R_0$ and $R_1$ may also be employed. In addition, higher order models may be used, i.e. relying on $R_2$, $R_3$. etc.

The full complexity method for converting the channel estimate into the frequency domain, involves calculating the matrix $R_0$ according to Eqn 4. For a conventional OFDM system with N subcarriers and C cyclic prefix samples, $H_0$ may be generated from the first N+C elements of the time-domain channel estimate $\hat{h}_t$. Calculation of $R_0$ via this method has $O(N^3)$ complexity. For example, in the case of the 802.11a standard, approximately $6 \times 10^5$ multiply operations are required in the calculation. In the case of the 256 subcarrier OFDM variant of the 802.16 standard, when a guard of ¼ is selected, more than $3 \times 10^7$ multiply operations are required. The matrix $R_1$ may be generated in a similar manner. $H_1$ may be generated from rows N+C+1 through 2(N+C) and the first N+C columns of the time-domain channel estimate.

The model presented in the early part of this description highlights the significance of the $h_0$ and $h_1$ vectors, for effective signal combining and cancellation. Moreover, it indicates that the significance of the non-principal diagonal components of $R_0$ and $R_1$ diminishes quickly when moving away from the principal diagonal. This motivates the development of a computationally efficient method for calculating $h_0$ and $h_1$. We now describe two computationally efficient methods for this calculation. Either method may be used for domain converter 206. Method 1 is based on a circulant extension of the time-domain model. Method 2 is based on a linear diagonal decomposition of the time domain model.

Method 1(Circulant Extension):

The vectors $h_0$ and $h_1$ are specified via $$h_0 = \text{diag}(F_{rx}^* H_0 F_{tx})$$
$$= \text{diag}(W_N L F_{tx})$$

$$h_1 = \text{diag}(F_{rx}^* H_1 F_{tx})$$
$$= \text{diag}(W_N U W_N^*)$$

Where the matrix L is the N×N+C sub-matrix of $H_0$ starting at row C+1 and column 1. The matrix U is the N×N sub-matrix of $H_1$ starting at row C+1 and column 1 (assuming that row and column indexes start from 1).

Since both L and U are sub-matrices of a convolution matrix, they can always be extended to form larger, 2N×2N, circulant matrices, i.e. matrices where each row is obtained from the previous row via cyclic shift one place to the right. Denote these constructed circulant matrices as $L_2$ and $U_2$. Note that these matrices are only used in the derivation of the method, and are not required for implementation of the method.

Circulant matrices are completely specified by their first row. Using the well known MATLAB™ notation, the first row of $L_2$ is the vector l=[L(1,1:N+C),L(N,1:N−C)]. The first row of $U_2$ is the vector u=[U(1,1: N),$0_{1 \times N}$]. Other cyclic rotations of l are also valid candidates for the first row of $L_2$. Similarly, other cyclic rotations of u are also valid candidates for the first row of $U_2$.

The eigenvectors of a circulant matrix are the columns of the Fourier matrix and the eigenvalues are the Fourier transform of the first row of the circulant matrix. Let $l_f$ be the Fourier transform of l and let $u_f$ be the Fourier transform of u. These transforms may be computed efficiently using 2N point fast Fourier transforms. Thus $$L_2 = W_{2N} \text{diag}(l_f) W_{2N}^*$$

$$U_2 = W_{2N} \text{diag}(u_f) W_{2N}^*$$

And furthermore, L is the N×N+C top-left sub-matrix of $L_2$, and U is the N×N top-left sub-matrix of $U_2$. Let $$J_1 = (I_N 0_N)$$

$$J_2 = (I_{N+C} 0_{N+C \times 2N-N-C})$$

The vectors $h_0$ and $h_1$ may now be re-written as follows $$h_0 = diag(W_N J_1 W_{2N} diag(l_f) W_{2N}^* J_2^* F_{tx})$$

$$h_1 = diag(W_N J_1 W_{2N} diag(u_f) W_{2N}^* J_1^* W_N^*)$$

Defining $$Z_1 = W_N J_1 W_{2N}$$

$$Z_2 = W_{2N}^* J_2 F_{tx}$$

And re-arranging leads to $$h_0 = (Z_1 \odot Z_2) l_f$$

$$h_1 = (Z_1 \odot Z_1^*) u_f$$

Here, and elsewhere in this document, $\odot$ denotes element-wise product (sometimes called Hadamard product). Note that the matrices $Z_1 \odot Z_2$ and $Z_1 \odot Z_1^*$ are constant and do not depend on the received signal or the channel. They can be pre-computed and stored in memory.

Using this method requires only two 2N point fast Fourier transforms and two matrix-vector multiplications. Note that matrix vector multiplications can be performed in parallel, i.e. per sub-carrier. The total number of operations required is approximately $4N \log 2N + 4N^2$.

For 802.11a this is $1.8 \times 10^4$ multiply operations, and for 802.16 with 256 sub-carriers it is approximately $2.7 \times 10^5$ multiply operations. This represents less than 1% of number of operations required by the full complexity method respectively for each case.

The number of operations can be further reduced by making use of the special structure of $Z_1 \odot Z_2^*$ and $Z_1 \odot Z_1^*$, which are sparse. This further reduces the number of multiplications required.

The number of computations per symbol may also be reduced by computing the coefficients for a reduced number of sub-carriers. In fact it may be advantageous to alternate between computations for different sets of sub-carriers. This could be useful when the channel coherence frequency is large enough to enable re-use of channel coefficients across several sub-carriers, without having to actually compute each one individually.

In the case that the time domain channel estimate used to construct the matrices L and U has only a small number of taps, it may be more efficient to directly compute the discrete Fourier transform via multiplication of complex sinusoids by the time domain tap weights. For example, for 802.11a, this method can be more efficient with less than 7 non-zero time domain taps.

Method 2(Linear Diagonal Decomposition):

The vectors $h_0$ and $h_1$ are specified via $$h_0 = diag(F_{rx}^* H_0 F_{tx})$$

$$= diag\left(F_{rx}^* \sum_{i=0}^{N+C-1} \hat{h}_{ti} D_{-i} F_{tx}\right)$$

$$= \sum_{i=0}^{N+C-1} \hat{h}_{ti} diag(F_{rx}^* D_{-i} F_{tx})$$

$$h_1 = diag(F_{rx}^* H_1 F_{tx})$$

$$= diag\left(F_{rx}^* \sum_{i=0}^{N+C-1} \hat{h}_{ti} D_{N+C-1-i} F_{tx}\right)$$

$$= \sum_{i=0}^{N+C-1} \hat{h}_{ti} diag(F_{rx}^* D_{N+C-1-i} F_{tx})$$

Where $D_i$ is a matrix that is zero in every element except along diagonal i, and one in every element along diagonal i, where by convention i=0 denotes the principal diagonal and negative values of i indicate diagonals below the principal diagonal. Define the matrix $M_0$ whose column number i is the vector formed from $diag(F_{rx}^* D_{-i} F_{tx})$. Similarly define the matrix $M_1$ whose column number i is the vector formed from $diag(F_{rx}^* D_{N+C-1-i} F_{tx})$. Then the conversion can be implemented according to $$h_0 = M_0 \hat{h}_t$$

$$h_1 = M_1 \hat{h}_t$$

This requires only two complex matrix-vector multiplications, which is approximately 2N(N+C) operations. The matrices $M_0$ and $M_1$ do not depend on the channel or the transmitted data. They can be pre-computed and stored for use by the domain converter 206, or they can be constructed on the fly to save on storage. In the case that there are only T non-zero time domain taps, the complexity reduces to $NT^2$. This diagonal decomposition method may also be used to determine other frequency-domain tap vectors. The extension to these other taps may be done by taking other non-principal diagonals of the matrices $diag_j(F_{rx}^* D_{-i} F_{tx})$ and $diag_j(F_{rx}^* D_{N+C-1-i} F_{tx})$ and determining non-principal-channel estimates according to $$h_0^j = M_0^j \hat{h}_t$$

$$h_1^j = M_1^j \hat{h}_t$$

and excluding zero entries in $\hat{h}_t$.

There is further structure in the matrix $M_0$ that allows further complexity reductions, via use of the Fast Fourier transform. This simplification arises by noting that $$M_0 \hat{h}_t = W_N g_t$$

i.e. the discrete Fourier transform of a vector $g_t$, where the vector $g_t$ is obtained as follows.

$$m_0 = abs(M_0(1,:))$$

$$\hat{h}_t' = m_0 \odot \hat{h}_t$$

$$g_t = \hat{h}_t'(1:N) + \begin{bmatrix} \hat{h}_t'(N=1:N+C) \\ 0_{N-C \times 1} \end{bmatrix}$$

The resulting complexity is approximately $N+C+N \log N$. The vector $m_0$ has elements which can be pre-computed and stored, or may be computed on the fly to save storage. These elements are given by $$m_{0i} = \begin{cases} 1, & i = 1, 2, \ldots C \\ \dfrac{N+C-i}{N}, & i = C+1, \ldots N+C \end{cases}$$

A similar method can be used to obtain $h_1$ via a Fast Fourier transform.

Frequency Domain—Time Domain (Tx Estimate) 214

A time domain estimate of the transmitted symbols is reconstructed from the frequency domain version output by decoder 212, on a per OFDM symbol basis, using the standard inverse FFT method, as found in the transmitter 100. A cyclic prefix may be added to the symbol, in accordance with the process undertaken at the transmitter 100.

Equalizer

Figure 14:
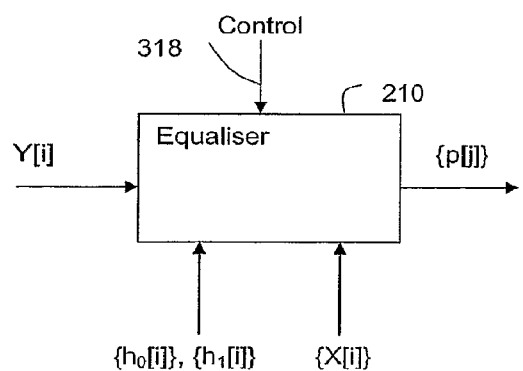
FIG. 14 is a block functional diagram representing a generic equaliser interface model for an equaliser component of the receiver of FIG. 8.

The equalizer block 210, shown in FIG. 14, is responsible for generating metrics (p[i]) suitable for use in the decoder 212. These are typically a-priori probabilities or log-likelihood ratios. The equaliser 210 receives estimates of X fed back from the decoder 212. Another input to the equaliser 210 is a frequency-domain version of the observation input y. The equaliser also receives frequency-domain estimates of $h_0$ and $h_1$ from the domain converter 206 and statistics 318 from the statistics calculator 308 of channel estimator 204.

An equaliser 210 will attempt to recover all energy pertaining to a particular symbol of interest while minimising the interference from other symbols. Recall from eqn 7, that our observation model for each OFDM symbol is $$Y[i] = R_0[i]X[i] + R_1[i]X[i-1] + n[i]$$

We see that observations Y[i] and Y[i+1] have components due to symbol X[i]. This observation model is equivalent to a time-varying, two-tap, vector ISI channel model. The equaliser 210 may obtain decoder input metrics from such an observation sequence using many techniques. These include:

- Trellis based schemes such as APP and Viterbi equalisers. These may be soft output;
- Concatenated linear filtering (e.g. LMMSE, MRC etc) following by soft or hard interference cancellation;
- Interference Cancellation followed by linear filtering (e.g. LMMSE).

In one arrangement we treat ICI as noise and obtain the per-subcarrier ISI model $$Y[i] = h_0[i] \odot X[i] + h_1[i] \odot X[i-1] + z[i]$$

where the inter-carrier interference (from both symbols i and i−1) has been moved into the noise vector z[i]. Note that the power in the noise process z[i] ($\sigma_z^2$) is likely to be higher than the power in the sequence n[i] of eqn 7.

Using estimates for $h_0[i]$ and $h_1[i]$ we apply one of the equalisers listed above. In one preferred embodiment we
1. apply a two tap per subcarrier maximum ratio combiner (MRC) for each received OFDM symbol $$\hat{X}_{mrc}[i] = h_0^*[i] \odot Y[i] + h_1^*[i+1] \odot Y[i+1]$$

where the resulting observation model at the output of the MRC is $$\hat{X}_{mrc}[i] = h_0^*[i] \odot h_0[i] \odot \hat{X}[i] +$$
$$h_1^*[i+1] \odot h_1[i+1] \odot \hat{X}[i] + h_1^*[i] \odot h_0[i] \odot \hat{X}[i-1] +$$
$$h_1^*[i+1] \odot h_0[i+1] \odot \hat{X}[i+1] h_1^*[i+1] \odot h_0[i+1] \odot \hat{X}[i+1] =$$
$$\alpha[i] \odot \hat{X}[i] + \beta[i] \odot \hat{X}[i-1] + \gamma[i] \odot \hat{X}[i+1]$$

The interference gain components μ[i] and γ[i] are readily calculated from the channel estimate sequences $\{h_0[i]\}$ and $\{h_1[i]\}$ 2. using previously calculated estimates of X[i−1] and X[i+1] apply interference cancellation to each OFDM symbol as follows $$\hat{X}_{mrcic}[i] = \hat{X}_{mrc}[i] - \beta[i] \odot \hat{X}[i-1] - \gamma[i] \odot \hat{X}[i+1]$$

3. compute decoder metrics from $\hat{X}_{mrcic}[i]$ using a Gaussian distribution model with conditional mean equal to α[i] and estimate of the observation noise power $\sigma_z^2$.

In the case of A receive antennas only the combining at step 2 would require expansion to include all time and antenna diversity available.

$$\hat{X}_{mrc}[i] = \sum_{a=1}^{A} h_0^*[i, a] \odot Y[i, a] + h_1^*[i+1, a] \odot h_0[i+1, a]$$

With the interference coefficients now calculated $$\gamma[i] = \sum_{a=1}^{A} h_1^*[i+1, a] \odot h_0[i+1, a]$$

$$\beta[i] = \sum_{a=1}^{A} h_1^*[i, a] \odot h_0[i, a]$$

In mild delay spread conditions it can be advantageous to use single tap MRC, rather than two tap MRC. Additionally, the equalizer 210 may employ the estimated RMS delay spread of the channel, which is input from the channel estimator block 204, to adapt its settings accordingly as the channel conditions alter.

Figure 15:
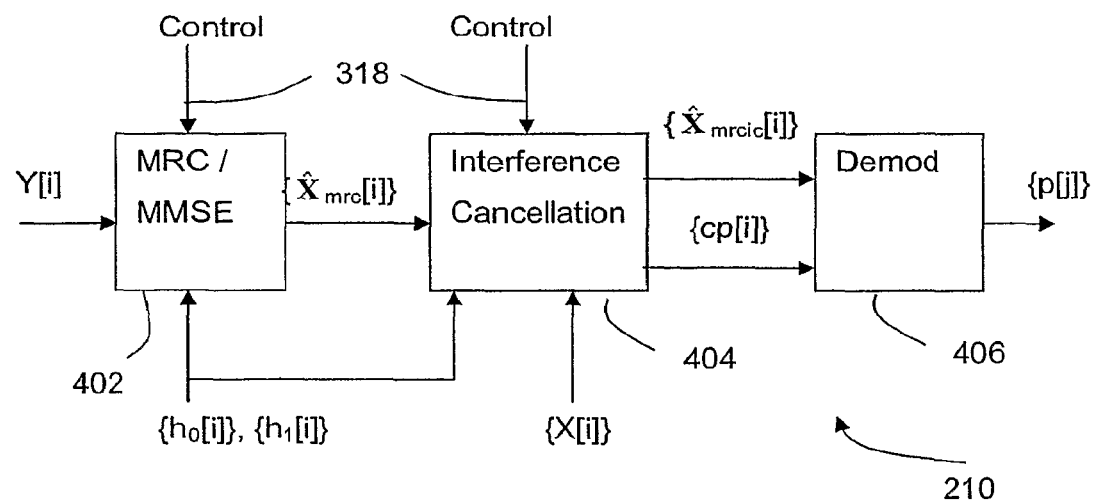
FIG. 15 is a block functional diagram illustrating a 2-tap Maximum Ratio Combiner, 2-tap Interference Cancellation model incorporated in the generic equaliser interface model of FIG. 14.

One arrangement for the equaliser 210 is shown in FIG. 15, in which the equaliser 210 includes a linear combiner 402 followed by an interference cancellation module 404 and a demodulation block 406. The frequency domain sequence y[i] of OFDM symbol observations is processed by the linear combiner 402 (being MRC or MMSE in nature).

If a Maximum Ratio Combiner (MRC) is used, the intermediate value output by the linear combiner 402 is calculated according to:

$$\hat{X} = \hat{R}^* Y$$

where $\hat{R} = G^*_{rx} \hat{H} G_{tx}$ is an estimate of R, $\hat{X}$ is an estimate of X and $\hat{H}$ is an estimate of the time varying time domain channel matrix H.

If a Minimum Mean-Squared Error (MMSE) sequence is used, the intermediate value output by the linear combiner 402 is calculated from:

$$\hat{X} = (\hat{R}^* \hat{R} + \sigma^2 I)^{-1} \hat{R}^* Y$$

The output of the combiner 402, (denoted $\hat{X}_{mrc}[i]$ in the case of an MRC sequence) has interference introduced which is removed by the following interference cancellation module 404. The interference cancellation module forms the "channel" coefficients, γ and β, internally and using previous (potentially soft) data estimates. The IC module 404 outputs the improved symbol-estimate sequence $\hat{X}_{mrcic}[i]$ and a statistic (cp[i]) of the channel coefficients that assists the demodulation module 406 when module 406 estimates the statistics of the channel against which it demodulates. It is preferable that the demodulator 406 estimates the noise power after the application of the interference cancellation module 404 because there may be errors in the IC process that may contribute to the noise power.

Because the linear combiner 402 and IC stages 404 are linear they may be reversed in order of application.

In other embodiments, the operating method of the combiner 402 may be changed dynamically between iterations and/or received OFDM symbol index. In one embodiment the number of received OFDM symbols employed in the combining process may be set according to a predetermined system state metric. In another embodiment the number of frequency domain channel components employed in the combining process may be set according to a predetermined system state metric. In another embodiment, the combiner 402 may use a MMSE technique as described herein for the first iteration, and then switch to some other combining technique, e.g. MRC, for subsequent iterations. In another embodiment, the combiner 402 may switch from one technique to another, where the techniques may be selected from a lookup table, according to the iteration number, and/or OFDM symbol number. In the previously described embodiments, the system state metric may be some function of the RMS delay spread of the channel.

In other embodiments, the method of equalization may be changed dynamically between iterations and/or received OFDM symbol index. In one embodiment the number of received OFDM symbols employed in the equalization process is set according to a predetermined system state metric. In another embodiment, the number of frequency domain channel components employed in the equalization process may be set according to a predetermined system state metric. In the previously described embodiments, the system state metric may be some function of the RMS delay spread of the channel.

The per-subcarrier ISI model given in eqn 13 considers a useful contribution of the main diagonals of $R_0$ and $R_1$, i.e. the vectors $h_0$ and $h_1$, while treating other diagonals of these matrices as an effective contribution to noise. Recall from the model presented in the early part of this description, that any non-principal diagonal components of $R_0$ and $R_1$ may also be employed for combining and cancellation. Moreover, the model suggests that a relatively large proportion of the potential gain from considering additional off-diagonals of $R_0$ and $R_1$ may be realized by selecting a small number of such components which reside close to the principal diagonals. These non-principal diagonals of $R_0$ and $R_1$ may be provided by the time-to-frequency converter 206, and in such cases eqn 13 may be generalized to include these inter-carrier interference terms. These vectors may be included in eqn 13 via transmit symbol product terms, in a similar manner to $h_0$ and $h_1$, while removing their contribution to the noise vector z[i]. The methods described above for use in the equaliser block 210 may be extended to make use of this generalized model.

Thus, the generalised output of the MRC combiner 402 is:

$$\hat{X}_{mrc}[i] = \sum_j \hat{R}_j^*[i+j]Y[i+j]$$

In the generalised case, the interference cancellation block 404 then generates an output:

$$\hat{X}_{mrcic}[i] = \hat{R}_0^*[i]\hat{R}_0[i]X[i] - \sum_{(j,k)\neq(0,0)} \hat{R}_j^*[i+j]\hat{R}_k[i+j]\hat{X}_{mrc}[i+j-k]$$

where $\{\hat{X}_{mrc}[j], j\neq i\}$ equates to estimates for interfering symbols.

Decoder

The decoder block 212 uses the output of the equalizer 210 as an input to drive a Forward Error Correcting (FEC) decoder 504, 510. The decoder 212 provides an estimate of the transmitted data based upon these inputs and the constraints of the FEC code 104 employed at the transmitter 100. The code constraints may be applied to individual symbols, and/or to groups of symbols, and/or to the entire packet. If an interleaver 106 is present in the transmitter 100, then the complementary de-interleaving procedure 502 is performed at the input of the decoder block 212.

The decoder 212 may use the soft inputs from the equalizer 210, or it may be a hard input decoder which makes a hard decision at the input. The decoder 212 may employ any soft or hard output algorithm which is applicable to the FEC code being used. The decoder 510 may, for example, employ the a-posteriori Probability (APP) or Viterbi algorithm, or some form of belief propagation. The outputs of the FEC decoder 504 are Interleaved by interleaver module 506 and provided to symbol mapper 508 in order to regenerate an estimate of the transmitted symbols. Mapped symbols may be either hard or soft values.

Figure 17:
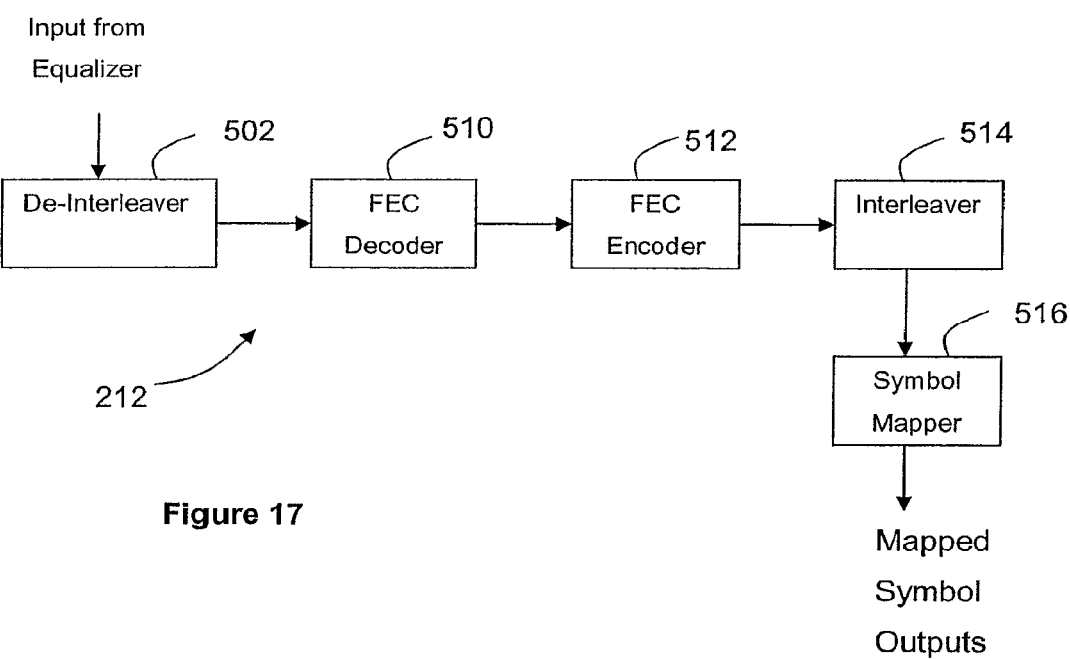
FIG. 17 is a block functional diagram of the decoder block of FIG. 8 having an FEC decoder that outputs an information sequence estimate

FIG. 17 shows an arrangement in which the decoder 212 outputs an information sequence estimate only. In this arrangement the input to the decoder 212 is de-interleaved 502, FEC decoded 510 then FEC encoding 512 (as performed in the transmitter 100) is performed prior to interleaving. The interleaver 514 passes its output to symbol mapper 516, which regenerates an estimate of the information sequence to form an output of the decoder 212.

Process Scheduling

In order to reduce receiver side latency, the functional blocks described above may be arranged in a pipeline. Communication between blocks may occur on a time slotted basis. A time slot may, for example, be chosen to equal a single OFDM symbol period, some multiple of OFDM symbol periods, or some division of an OFDM symbol period. For example, the decoder 212 may calculate a new transmitted symbol estimate for a given time slot while the channel estimator 204 updates an estimate corresponding to a past time slot.

One or more iterations of the receiver algorithm may be undertaken with the aim of improving both the transmitted symbol estimate and the channel estimate. In some cases, a checksum may be present across the data, or the FEC decoder 504, 510 may have the ability to validate its output. Either may serve as an early stopping criterion for the overall iterative loop.

The code constraint imposed by the particular FEC decoder employed may play a role in determining the most efficient pipelined implementation. For example, a coded FEC block may correspond to a single OFDM symbol, as in the case for the 802.16 OFDM standard. Pipelined update schedules suitable to such cases are described in Applicant's co-pending PCT application PCT/AU2006/00120, claiming priority from Australian Provisional Patent application No 2005904528 filed on 22 Aug. 2005. In some cases a FEC coding may be performed across multiple OFDM symbols, e.g. as dictated by the 802.11a/g standard. In such cases the receiver latency can be reduced by running two or more pipelined decoders in parallel. In such a configuration, one decoder is applied to the first iteration for a given timeslot, the second decoder is applied to the second iteration for a past time slot, and so on. The relative delay between the selected time slots may be exploited by other pipelined processes, for example in the case of a convolutional code, to perform traceback and calculate new decoder metrics. If required, a decoder control schedule may be precomputed and stored in memory for use at runtime. An example schedule which employs two parallel decoders for the case of an 802.11a/g receiver is discussed in the following section.

Example 802.11a/g Parallel Decoding Schedule

In IEEE 802.11 systems the FEC coding may be unterminated between OFDM symbols (except for the first data bearing OFDM symbol known as the signal field). In this example we employ an OFDM symbol based approach in the receiver, for joint data and channel estimation, requiring an OFDM symbol based FEC engine. The main steps in the FEC/Channel Estimation loop are executed in two parallel streams as shown in Table 1. These streams are executed upon reception of OFDM symbol i from the FFT.

TABLE 1

Channel Estimation and FEC Decode OFDM Symbol Threads

| | Threads | |
| --- | --- | --- |
| Step | Channel Estimation | FEC |
| 1 | Update i−1, Get i | Decode i |
| 2 | Temp Update i, Get i+1 | Decode i |

These same threads may be employed in a particular embodiment for the case when each FEC block spans a single OFDM symbol, e.g. as dictated by the IEEE 802.16-2005 OFDM standard. In this example we must accommodate multi-OFDM symbol traceback of a Viterbi Trellis, as the 802.11a/g FEC is a Convolutional Code.

This may be accomplished under a redefinition of the "Decode i" step. In the case of a single OFDM symbol per FEC block, "Decode i" may be interpreted as the determination of an information bit and Tx Symbol estimate for OFDM symbol i, by decoding OFDM symbol i using a channel estimate for symbol i. In this example, we must construct a Viterbi execution plan that yields the same outputs but will necessarily require different inputs to enable traceback.

There are at least three impacts of this traceback requirement
1. The processing of the OFDM symbols must be delayed relative to the received symbol wavefront
2. Channel estimates must be provided for all symbols in the Viterbi traceback.
3. A termination plan must be derived for the end of the packet where the Trellis is terminated.

The first impact may be addressed by redefining the trigger event for the processing. In the case of a single OFDM symbol per FEC block we may trigger on receipt of OFDM Symbol i. In this example case we trigger on receipt of OFDM Symbol i+D where D is the number of extra OFDM symbols required for quality Viterbi traceback. The constraint length of the Convolutional code is 7 so we would normally require 35 bits of traceback. For BPSK each OFDM symbol contains only 24 bits so we use two additional OFDM symbols, giving a minimum traceback length of 48 bits. It may also be possible to employ a shorter traceback length, with a potential tradeoff of performance for decreased latency. Moreover, for higher constellation sizes, a traceback length of 35 bits may be provided with a single additional OFDM symbol.

The second impact may be addressed by redefinition of "Get i". When there is one OFDM symbol per FEC block this subfunction provides the necessary channel estimates for the next Decode step. For the 802.11a/g example, the requirements, in terms of channel estimation, of the decode step have changed. Not only do we require a channel estimate for symbol i, we also require one for OFDM Symbol i+1 and i+2. These are readily provided by the Channel Estimate Database (CEDB) using a residual IFO spin method to phase shift the estimate for each forward prediction in time.

The third impact may be addressed by asserting "Packet Decoded" when "Step 2: Decode" traces back from the terminated OFDM symbol (the last OFDM Symbol) for the first time. This step may be executed upon reception of the last OFDM symbol from the FFT and has the added advantage of reducing decode latency.

A schedule, assuming the parallel use of two FEC blocks and one CEDB block is shown in Table 2.

The set of all packet lengths may be covered by approximately 3 to 4 Finite State Machine (FSM) classes. The FSM to be employed for control can be determined after the common startup phase, ending after the final decoding of the Signal Field in Symbol Interval 6.

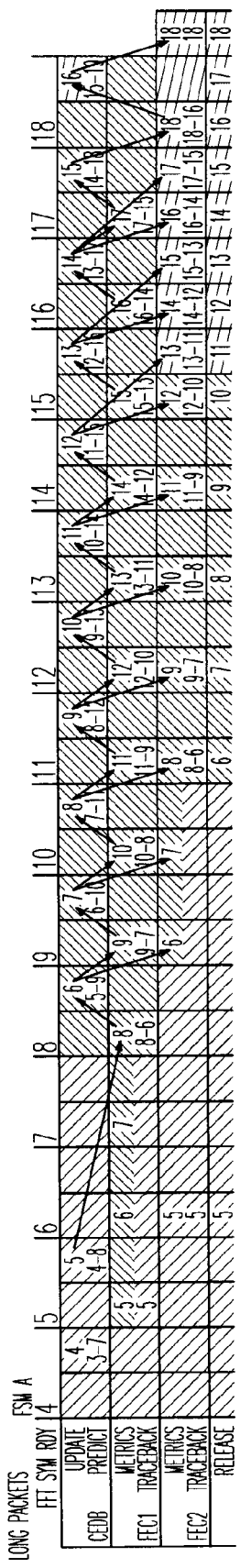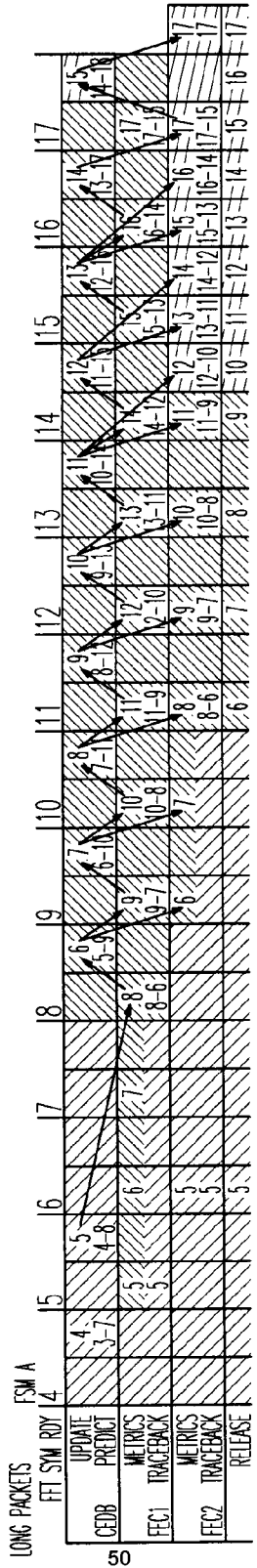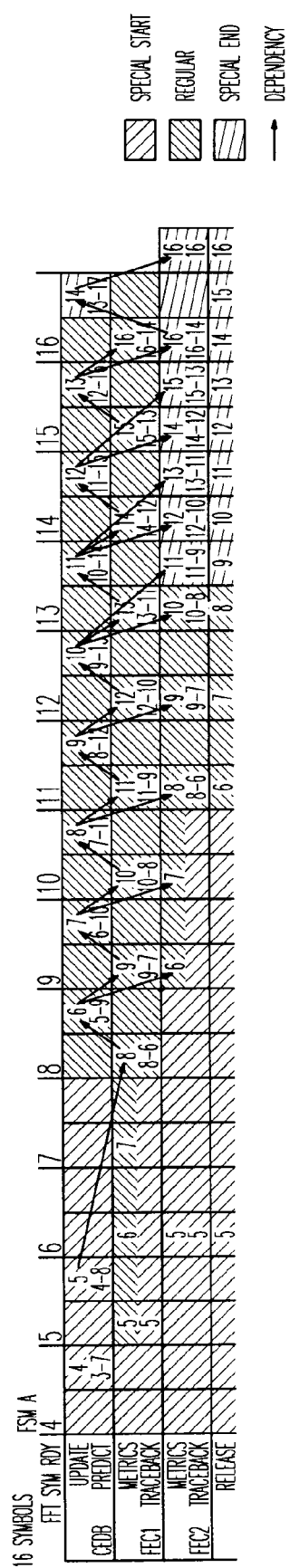

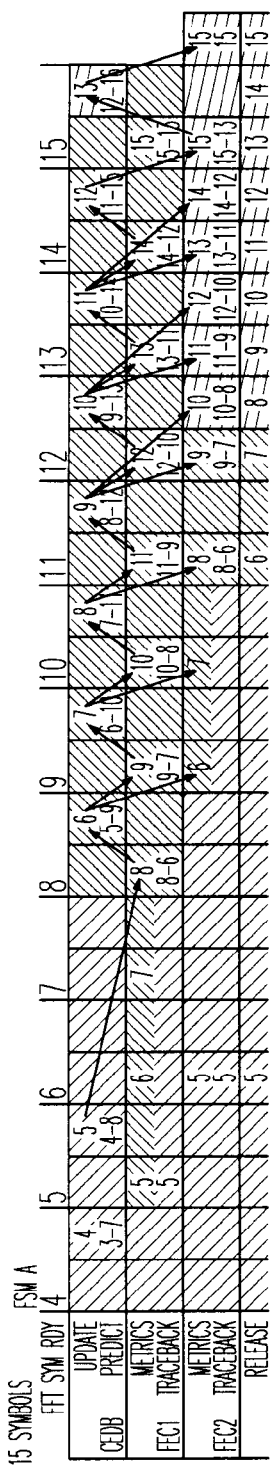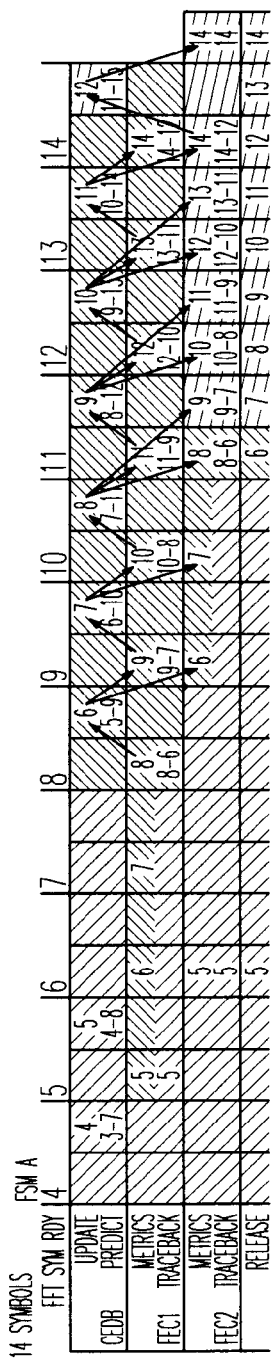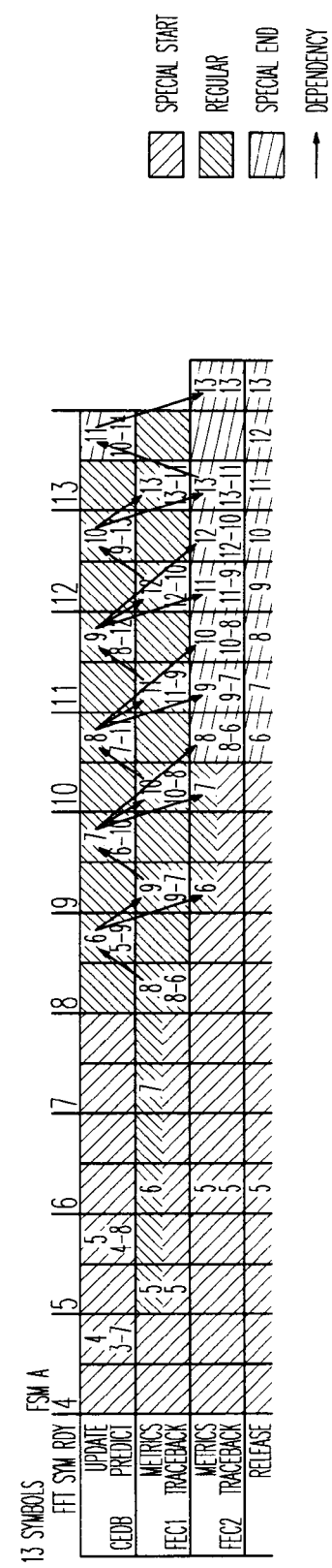

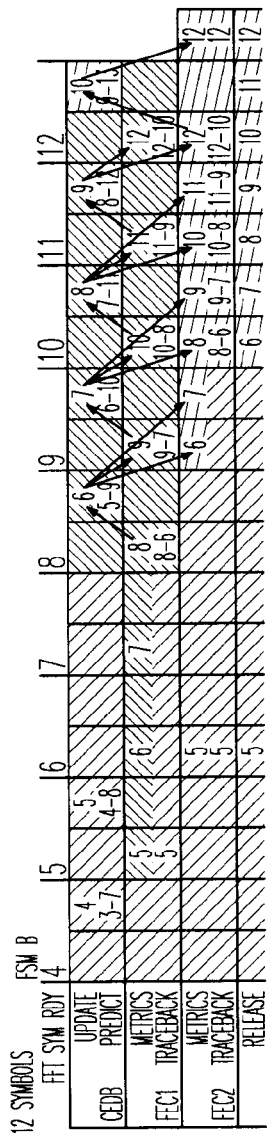
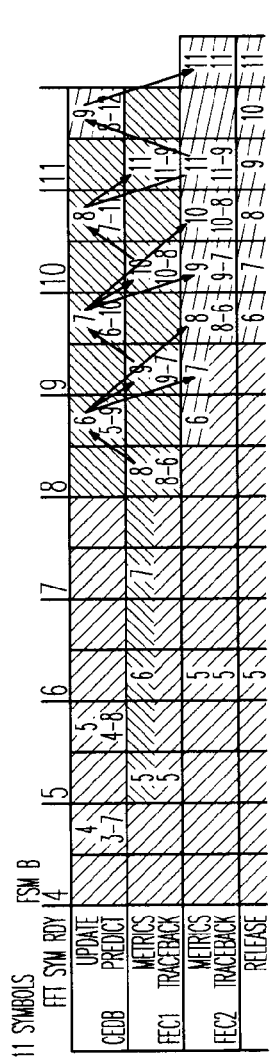
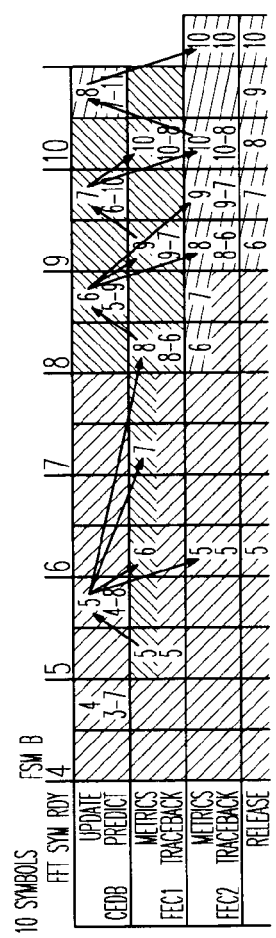

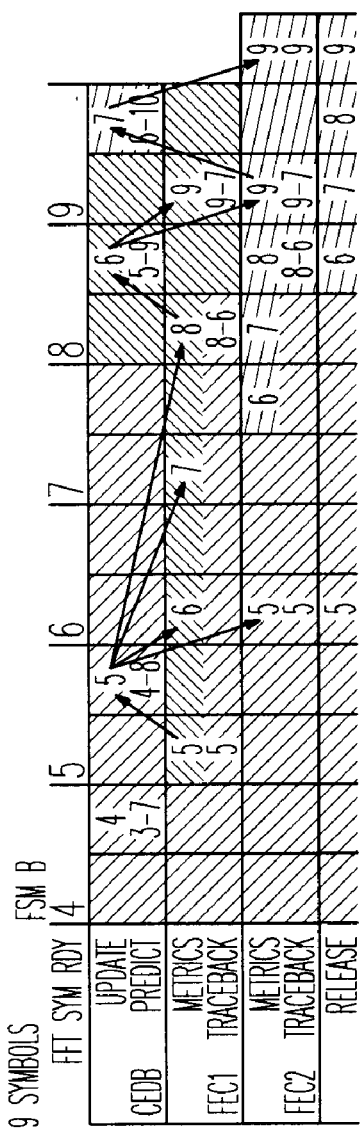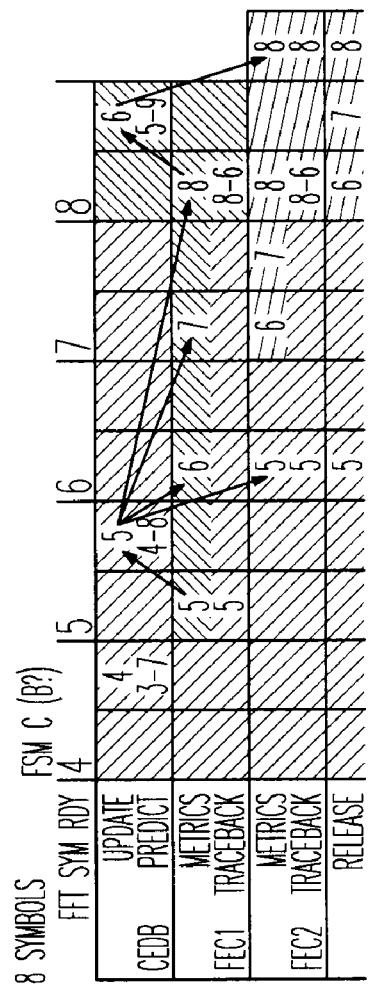

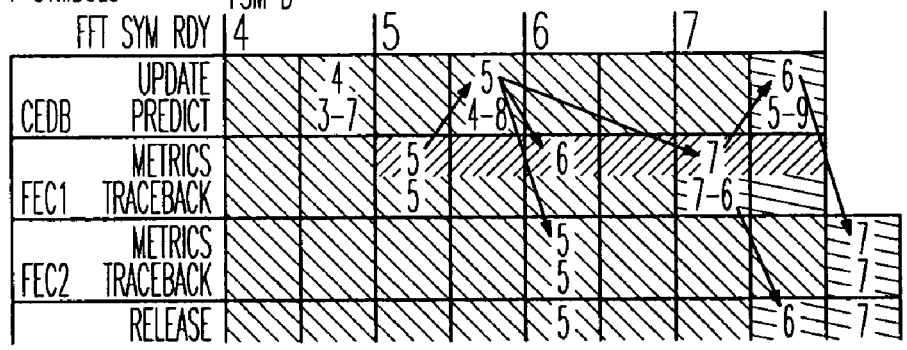
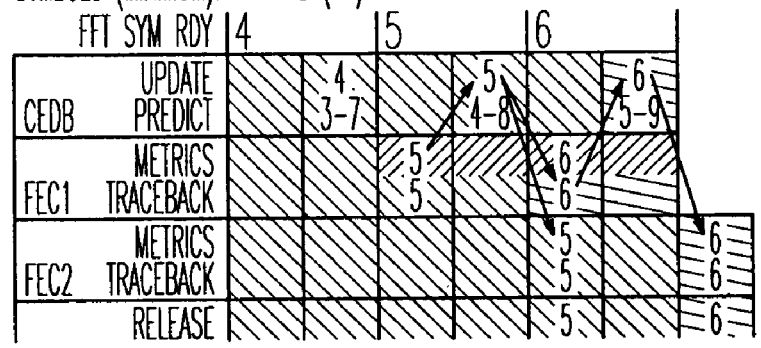
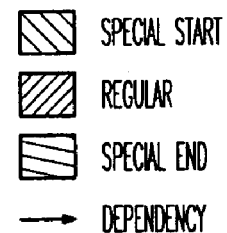
Table 2: Example iterative parallel decode schedule for 802.11a The methods described herein advantageously provide a first domain channel estimation process that employs decoder outcomes to enable the determination of an accurate time domain channel estimate.

Channel estimation may be provided where the channel may be time varying (e.g. as induced by mobility).

The frequency domain channel estimates for pairs of successive OFDM symbols may be used to combine the received OFDM symbols (and across antennas if there are multiple antenna).

The frequency domain channel estimates for pairs of successive OFDM symbols may be used to interference cancel (IC) the combiner output.

The symbol estimates used in the Interference Cancellation are provided by previously decoding the corresponding Received OFDM Symbols.

The previous decoding may be soft output (e.g. Viterbi, APP).

In the described methods a reduced complexity technique (based on partial correlations) may be employed to determine which taps to estimate and then to use full complexity only on those taps.

It will be appreciated by those skilled in the art, that the invention is not restricted in its use to this particular application described, neither is the present invention restricted to its preferred embodiment with regards to the particular elements and/or features described or depicted herein. It will be appreciated that various modifications can be made without departing from the principles of the invention. Therefore, the invention should be understood to include all such modifications within its scope.

For example, the processing described herein may be generalised to an iterative process involving operations in two different domains. For example, the second transform domain may be arise from the use of Laplacian or Wavelet transforms.

While this invention has been described in connection with specific embodiments thereof, it will be understood that it is capable of further modification(s). This application is intended to cover any variations uses or adaptations of the invention following in general, the principles of the invention and comprising such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof."

REFERENCES

[1] P. Alexander and D. Haley, "Physical Layer Challenges in Mobile Broadband OFDM Communications Systems," Cohda Wireless Whitepaper, August 2005.
[2] J. Medbo and P. Schramm "Channel Models for HIPERLAN/2 in Different Indoor Scenarios," ETSI/BRAN document no. 3ER1085B, March 1998.
[3] J. Heiskala and J. Terry, "OFDM Wireless LANs: A Theoretical and Practical Guide", Sams Publishing, 2002.
[4] IEEE Working Group 802.20, "Channel models for IEEE 802.20 MBWA system simulations Rev 03," November 2003.
[5] IEEE 802.11 WG, "IEEE Std 802.11a-1999(R2003), Part 11: Wireless LAN Medium Access Control (MAC) and Physical Layer (PHY) specifications, High-speed Physical Layer in the 5 GHz Band."
[6] IEEE 802.11 WG, "IEEE Std 802.11g-2003, Part 11: Wireless LAN Medium Access Control (MAC) and Physical Layer (PHY) specifications, Amendment 4: Further Higher Data Rate Extension in the 2.4 GHz Band."
[7] IEEE 802.16 WG, "IEEE Std 802.16-2005, Part 16: Air Interface for Fixed Broadband Wireless Access Systems."

What is claimed is:

1. A method of data processing in a multi-carrier wireless communication network, the method comprising:
    obtaining a model of a channel in the multi-carrier wireless communication network;
    receiving a multi-carrier signal transmitted over the channel, the multi-carrier signal comprising a sequence of encoded symbols carried on a plurality of sub-carriers, wherein an error control coding of the encoded symbols occurs over a plurality of symbols;
    estimating, based on the received multi-carrier signal, parameters of the model of the channel;
    determining a decoded symbol based on a determination of estimates of two or more of the sequence of encoded symbols from the received multi-carrier signal, said determination of symbol estimates including:
        using at least one of the estimated parameters; and
        combining observations of at least two successive encoded symbols in the sequence of encoded symbols; and
    updating the estimated parameters during reception of the multi-carrier signal using at least one of the estimates of the two or more of the sequence of symbols.

2. The method as claimed in claim 1 further comprising:
    iterating said updating and determining steps, wherein the determined decoded symbol is used to update the estimated model parameters.

3. The method as claimed in claim 2 wherein said iterating continues until at least one stopping criterion is satisfied, the stopping criteria comprising at least one of:
    completion of a maximum number of iterations;
    reporting of a valid symbol decoding;
    reporting of a soft belief of a valid symbol decoding, the soft belief exceeding a threshold value; and
    successful performance of a checksum across decoded symbols.

4. The method as claimed in claim 2 wherein said updating of estimated parameters comprises:
modifying a set of accumulators using at least one data packet symbol of the received signal and at least one training symbol.

5. The method as claimed in claim 4 wherein the at least one training symbol comprises a previously-determined estimate of a transmitted symbol.

6. The method as claimed in claim 4 to wherein said updating calculates updated parameters using at least one of:
a sliding correlator;
a linear MMSE filter; and
a zero forcing (ZF) filter.

7. The method as claimed claim 4 wherein said updating comprises performing a sliding correlation of at least a portion of the received signal with a time domain estimate of a transmitted symbol.

8. The method as claimed in claim 2 comprising:
generating metrics for use by a decoder that is complementary to an encoder used in transmitting the signal, wherein the metrics are generated dependent on the estimated parameters and estimated symbols.

9. The method as claimed in claim 7 wherein said updating step applies a decorrelating filter to an output of the sliding correlation.

10. The method as claimed in claim 1 wherein said determination of symbol estimates is performed in a second domain, the method comprising:
transforming at least one of the estimated parameters from a time domain to provide at least one transformed parameter in the second domain.

11. The method as claimed in claim 10 wherein the second domain is a frequency domain.

12. The method as claimed in claim 10 wherein said combining uses the at least one transformed parameter.

13. The method as claimed in claim 10 wherein, in estimating an $i^{th}$ symbol, said determining step comprises:
calculating interference from at least one adjacent symbol in the sequence using the at least one transformed parameter; and
cancelling the calculated interference from the estimate of the $i^{th}$ symbol.

14. The method as claimed in claim 11 wherein said transforming comprises calculating transformed parameters $h_0$ and $h_1$ using:

$$h_0 = (Z_1 \odot Z_2) l_f$$

$$h_1 = (Z_1 \odot Z_1) u_f$$

where the bracketed terms are constant and $l_f$ and $u_f$ are Fourier transforms of vectors defining circulant matrices derived from the time-domain parameters.

15. The method as claimed in claim 11 wherein said transforming comprises calculating transformed parameters $h_0$ and $h_1$ using:

$$h_0 = M_0 \hat{h}_t$$

$$h_1 = M_1 \hat{h}_t$$

Where $M_0$ is a matrix whose column number i is the vector formed from $\mathrm{diag}(F^*_{rx} D_{-i} F_{tx})$ and $M_1$ is a matrix whose column number i is the vector formed from $\mathrm{diag}(F^*_{rx} D_{N+C-1-i} F_{tx})$, $D_i$ is a matrix that is zero in every element except along diagonal i, and one in every element along diagonal i, where i=0 denotes the principal diagonal and negative values of i indicate diagonals below the principal diagonal, the M matrices being independent of the channel and transmitted data and $\hat{h}_t$ is the time-domain estimate of the channel.

16. The method as claimed in claim 13 wherein said transforming step provides a matrix representation of the model of the channel and wherein said combining step and said cancelling step use only principal diagonal components of the matrix representation.

17. The method as claimed in claim 13 wherein said determining step comprises estimating the $i^{th}$ symbol using forward-error-correction (FEC) decoding and said updating step comprises updating the estimated parameters using the estimated $i^{th}$ symbol.

18. The method as claimed in claim 14 wherein said transforming comprises forming a linear combination of elements of the estimated channel model.

19. The method as claimed in claim 12 wherein said combining step uses at least one of:
a maximum ratio combiner (MRC); and
a minimum mean squared error (MMSE) combiner.

20. The method as claimed in claim 18 wherein said forming a linear combination uses a known structure of zero-valued elements in the estimated channel model.

21. The method as claimed in claim 19 comprising changing a technique used in said combining step.

22. The method as claimed in claim 19 comprising changing a number of received symbols used in said combining step.

23. The method as claimed in claim 22 wherein the number is changed dependent on a system state metric.

24. The method according to claim 1 wherein the signal comprises a known portion and said estimation uses the known portion to estimate an initial estimate of the model parameters.

25. The method as claimed in claim 24 wherein said estimating comprises performing a sliding correlation of at least a portion of the received signal with the known portion available at a receiver in the communication network.

26. The method as claimed in claim 24 wherein said estimating step uses a minimum mean squared error scaling factor corresponding to a noise component of the received observation.

27. The method as claimed in claim 24 wherein the known portion comprises repeated symbols having a set of zero-valued subcarriers in a frequency domain.

28. The method as claimed in claim 25 wherein said estimating comprises applying a decorrelating filter to an output of the sliding correlation.

29. The method as claimed in claim 27 further comprising:
calculating an estimate of received noise power from a variance of received values at subcarriers corresponding to the zero-valued subcarriers.

30. The method as claimed in claim 1 wherein said updating of estimated parameters is performed in a time domain.

31. The method as claimed in claim 1 wherein said updating of estimated parameters is performed in a frequency domain.

32. The method as claimed in claim 31 wherein said updating of estimated parameters comprises division or conjugate multiplication of a received frequency domain observation by an estimate of the transmitted sequence in the frequency domain.

33. The method as claimed in claim 1 wherein said updating changes from the a domain to a frequency domain after a point in time during reception of the signal.

34. The method as claimed in claim 33 wherein the point in time is selected from the group consisting of:

a predetermined delay after a start of said reception of the signal;

a time dynamically selected dependent on a system state metric;

a time dynamically selected dependent on statistic of the estimated channel model; and a time dynamically selected dependent on an estimated channel delay spread.

35. The method as claimed in claim 1 wherein the model is given by $$Y[i]=R_0[i]X[i]+R_1[i]X[i-1]+n[i]$$

where bracketed terms indicate a symbol period index;

$R_0$ and $R_1$ are submatrices of a matrix R that generally defines a channel transfer function given by $$R=G^*_{rx}HG_{tx}$$

where $G^*_{rx}$ is a receive-side transform matrix which translates received time-domain multicarrier symbols into a frequency domain;

H is a time-domain linear-convolution matrix used to model a linear convolution of the transmitted signal with the channel, and;

$G_{tx}$ is a transmit-side transform matrix, which translates transmitted multicarrier symbols into a time domain;

Y is a vector in a frequency domain representing the L multicarrier symbols received in said receiving step;

X is a vector in a frequency domain representing L transmitted symbols; and n is additive white Gaussian noise.

36. The method as claimed in claim 1 wherein the model used for said estimating and updating is given by:

$$Y[i] = \sum_j R_j[i]X[i-j] + n[i].$$

37. The method as claimed in claim 1 wherein the model used for said estimating and updating is adapted to utilise OFDM symbol constructions.

38. The method as claimed in claim 1 further comprising:

determining an estimate of the average power of the channel from the estimated model parameters; and determining an estimate of a RMS delay spread.

39. The method as claimed in claim 1, comprising:

selecting a set of taps for further processing based on the estimated model parameters, said selection comprising:

comparing a signal parameter for a plurality of taps to a predetermined threshold, the signal parameter being derived from the estimated model parameters; and providing signal processing to only those taps that are determined to have a signal parameter that exceeds the threshold.

40. The method as claimed in claim 39 wherein the predetermined threshold comprises one of:

a fixed value;

a value determined by a function of the estimated model parameters;

a variable value corresponding to a function of the estimate determined at each update of the estimate.

41. The method as claimed in claim 39 further comprising:

for each tap with a signal parameter exceeding the threshold, providing signal processing to a group of taps disposed on either side of the tap.

42. The method as claimed in claim 39 comprising locking the selection of taps for processing.

43. The method as claimed in claim 40 wherein the threshold comprises a value corresponding to:

the power of the channel estimate;

a function of the power of the channel estimate.

44. The method as claimed in claim 41 wherein the size of the group is determined as one of:

a fixed number;

a function of a RMS delay spread statistic.

45. The method as claimed in claim 42 wherein a time for locking the tap selection is one of:

a predetermined time;

a lock time obtained from a look-up table dependent on a metric of the estimated channel model.

46. The method as claimed in claim 45 wherein the metric is an estimate of noise power in the received signal.

47. The method as claimed in claim 1 wherein said updating comprises:

applying a filter to a current estimate of the parameters and at least one previous estimate.

48. The method as claimed in claim 47 wherein the filter is an auto-regression filter.

49. The method as claimed in claim 1 wherein said estimating accumulates values in an accumulator corresponding to each tap used for the estimated model, and wherein said updating uses the accumulated values.

50. The method as claimed in claim 1 wherein said estimating of model parameters is performed in a time domain.

51. A computer program product comprising machine-readable program code recorded on a non-transitory machine-readable recording medium, for controlling the operation of a data processing apparatus on which the program code executes to perform a method of data processing in a multi-carrier wireless communication network, the method comprising:

obtaining a model of a channel in the multi-carrier wireless communication network;

receiving a multi-carrier signal transmitted over the channel, the multi-carrier signal comprising a sequence of encoded symbols carried on a plurality of sub-carriers, wherein an error control coding of the encoded symbols occurs over a plurality of symbols;

estimating, based on the received signal, parameters of the model of the channel;

determining a decoded symbol based on a determination of estimates of two or more of the sequence of encoded symbols from the received multi-carrier signal, said determination of symbol estimates including:

using at least one of the estimated model parameters;

combining observations of at least two successive symbols in the sequence of symbols; and updating the estimated model parameters during reception of the multi-carrier signal using at least one of the estimates of the two or more of the sequence of symbols.

52. A computer program product comprising machine-readable program code recorded on a non-transitory machine-readable recording medium, for controlling the operation of a data processing apparatus on which the program code executes to perform a method of data processing in a multi-carrier wireless communication network, the method comprising:

obtaining a model of a channel in the multi-carrier wireless communication network;

receiving a multi-carrier signal transmitted over the channel, the multi-carrier signal comprising a sequence of symbols carried on a plurality of sub-carriers;

estimating, based on the received signal, parameters of the model of the channel;
transforming at least one of the estimated parameters from a time domain to provide at least one transformed parameter in a second domain;
determining a decoded symbol based on a determination of estimates of two or more of the sequence of encoded symbols from the received multi-carrier signal, said determination of symbol estimates including:
using the at least one transformed parameter;
combining observations of at least two successive symbols in the sequence of symbols; and
updating the estimated model parameters during reception of the multi-carrier signal using at least one of the estimates of the two or more of the sequence of symbols.

* * * * *